（12) United States Patent
Terlecki et al.

(10) Patent No.: US 12,541,514 B2
(45) Date of Patent: Feb. 3, 2026

(54) QUERY PROCESSING SYSTEM FOR SLOT-BASED EXECUTION OF QUERIES

(71) Applicant: MongoDB, Inc., New York, NY (US)

(72) Inventors: Pawel Terlecki, Miami, FL (US); Martin Neupauer, Freehold, NY (US); Svilen Mihaylov, Barrington, RI (US); Anton Korshunov, Dublin (IE); Ian Boros, New York, NY (US); Timour Katchaounov, New York, NY (US); David Lenox Storch, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 18/749,372

(22) Filed: Jun. 20, 2024

(65) Prior Publication Data

US 2024/0427767 A1    Dec. 26, 2024

Related U.S. Application Data

(60) Provisional application No. 63/509,511, filed on Jun. 21, 2023.

(51) Int. Cl.
*G06F 16/2453*    (2019.01)
(52) U.S. Cl.
CPC .............................. *G06F 16/24542* (2019.01)
(58) Field of Classification Search
CPC ........... G06F 16/24542; G06F 16/2453; G06F 16/24547; G06F 16/24549
See application file for complete search history.

(56) References Cited

U.S. PATENT DOCUMENTS

| | | | |
|---|---|---|---|
| 2015/0347507 A1* | 12/2015 | Annapragada | G06F 16/24542 707/718 |
| 2018/0329956 A1* | 11/2018 | Mittal | G06F 9/3867 |
| 2020/0142990 A1* | 5/2020 | Freedman | G06F 16/24542 |
| 2022/0035812 A1* | 2/2022 | Balaraman | G06F 16/24535 |
| 2023/0074090 A1* | 3/2023 | Chong | G06F 16/24561 |
| 2023/0141190 A1* | 5/2023 | Ma | G06F 16/24539 707/714 |

OTHER PUBLICATIONS

Graefe et al., Encapsulation of Parallelism in the Volcano Query Processing System. University of Colorado at Boulder. Department of Computer Science. Mar. 1990. 14 Pages.
Graefe. The Cascades Framework for Query Optimization. 10 Pages. https://15799.courses.cs.cmu.edu/spring/2025/papers/05-cascades/graefe-ieee1995.pdf [Accessed online Feb. 7, 2025].
Liu et al., Closing the functional and Performance Gap between SQL and NoSQL. Orcal Corporation. SIGMOD'16.Jul. 2016. 12 Pages.

* cited by examiner

*Primary Examiner* — Hares Jami
(74) *Attorney, Agent, or Firm* — Wolf, Greenfield & Sacks, P.C.

(57) ABSTRACT

Described herein embodiments of a query processing system. The query processing system optimizes execution by generating an optimized slot-based execution (SBE) plan for executing the query. The query processing system optimizes query execution by generating a logical representation of the query, optimizing the logical representation of the query, and translating the optimized logical representation of the query into an SBE plan. The query processing system then executes the SBE plan to generate the query results.

20 Claims, 11 Drawing Sheets

QUERY PROCESSING SYSTEM FOR SLOT-BASED EXECUTION OF QUERIES

RELATED APPLICATIONS

This application claims the benefit under 35 U.S.C. § 119(e) of U.S. Provisional Application Ser. No. 63/509,511, filed Jun. 21, 2023, and entitled "QUERY PROCESSING SYSTEM," which is hereby incorporated herein by reference in its entirety.

BACKGROUND

A database may store data for an organization or software application. Client devices may submit queries to view and/or update data in the database. The queries may be processed to perform updates and/or obtain data requested in the query. The query may be executed against the database.

SUMMARY

Described herein are embodiments of a query processing system. The query processing system optimizes execution by generating an optimized slot-based execution (SBE) plan for executing the query. The query processing system optimizes query execution by generating a logical representation of the query, optimizing the logical representation of the query, and translating the optimized logical representation of the query into an SBE plan. The query processing system then executes the SBE plan to generate the query results.

Some embodiments provide a system for executing queries against a database. The system comprises at least one processor and a plurality of components executable by the at least one processor. The plurality of components comprise: an interface component configured to receive, from a client device, a query requesting data from the database; a query optimizer configured to: generate a logical representation of the query; optimize the logical representation of the query to obtain an optimized logical representation of the query, the logical representation of the query indicating an execution plan; and translate the optimized logical representation of the query into a slot-based execution (SBE) plan; and an execution engine configured to execute the SBE plan against the database to obtain data requested by the query; wherein the interface component is further configured to output the data requested by the query to the client device.

Some embodiments provide a method for executing queries against a database. The method comprises using at least one processor to perform: receiving, from a client device, a query requesting data from the database; generating a logical representation of the query; optimizing the logical representation of the query to obtain an optimized logical representation of the query; translating the optimized logical representation of the query into a slot-based execution (SBE) plan; executing the SBE plan against the database to obtain data from the database; and outputting the data obtained from execution of the SBE plan against the database.

Some embodiments provide a non-transitory computer-readable storage medium storing instructions that, when executed by at least one processor, cause the at least one processor to perform a method for executing queries against a database. The method comprises: receiving, from a client device, a query requesting data from the database; generating a logical representation of the query; optimizing the logical representation of the query to obtain an optimized logical representation of the query; translating the optimized logical representation of the query into a slot-based execution (SBE) plan; executing the SBE plan against the database to obtain data from the database; and outputting the data obtained from execution of the SBE plan against the database.

Some embodiments provide a system for executing queries against a non-relational database storing a plurality of data objects, the plurality of data objects storing data as values of fields. The system comprises: a processor and memory storing instructions. The instructions, when executed by the processor, cause the processor to: receive a query specifying one or more criteria for objects stored in the non-relational database; generate a slot-based execution (SBE) plan for execution of the query, the SBE plan comprising a plurality of stages; execute the SBE plan, wherein executing the SBE plan comprises: access, during execution of a first stage of the plurality of stages, at least one field value from at least one data object of the plurality of data objects, the at least one field value required for execution of a second stage of the plurality of stages; store the at least one field value in at least one slot associated with the first stage for use in execution of the second stage; and execute the second stage at least in part by accessing the at least one value from the at least one slot associated with the first stage.

Some embodiments provide a method for executing queries against a non-relational database storing a plurality of data objects, the plurality of data objects storing data as values of fields. The method comprises using a processor to perform: receiving a query specifying one or more criteria for objects stored in the non-relational database; generating a slot-based execution (SBE) plan for execution of the query, the SBE plan comprising a plurality of stages; executing the SBE plan, wherein executing the SBE plan comprises: accessing, during execution of a first stage of the plurality of stages, at least one field value from at least one data object of the plurality of data objects, the at least one field value required for execution of a second stage of the plurality of stages; storing the at least one field value in at least one slot associated with the first stage for use in execution of the second stage; and executing the second stage at least in part by accessing the at least one value from the at least one slot associated with the first stage.

Some embodiments provide a non-transitory computer-readable storage medium storing instructions that, when executed by a processor, cause the processor to perform a method for executing queries against a non-relational database storing a plurality of data objects, the plurality of data objects storing data as values of fields. The method comprises: receiving a query specifying one or more criteria for objects stored in the non-relational database; generating a slot-based execution (SBE) plan for execution of the query, the SBE plan comprising a plurality of stages; executing the SBE plan, wherein executing the SBE plan comprises: accessing, during execution of a first stage of the plurality of stages, at least one field value from at least one data object of the plurality of data objects, the at least one field value required for execution of a second stage of the plurality of stages; storing the at least one field value in at least one slot associated with the first stage for use in execution of the second stage; and executing the second stage at least in part by accessing the at least one value from the at least one slot associated with the first stage.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
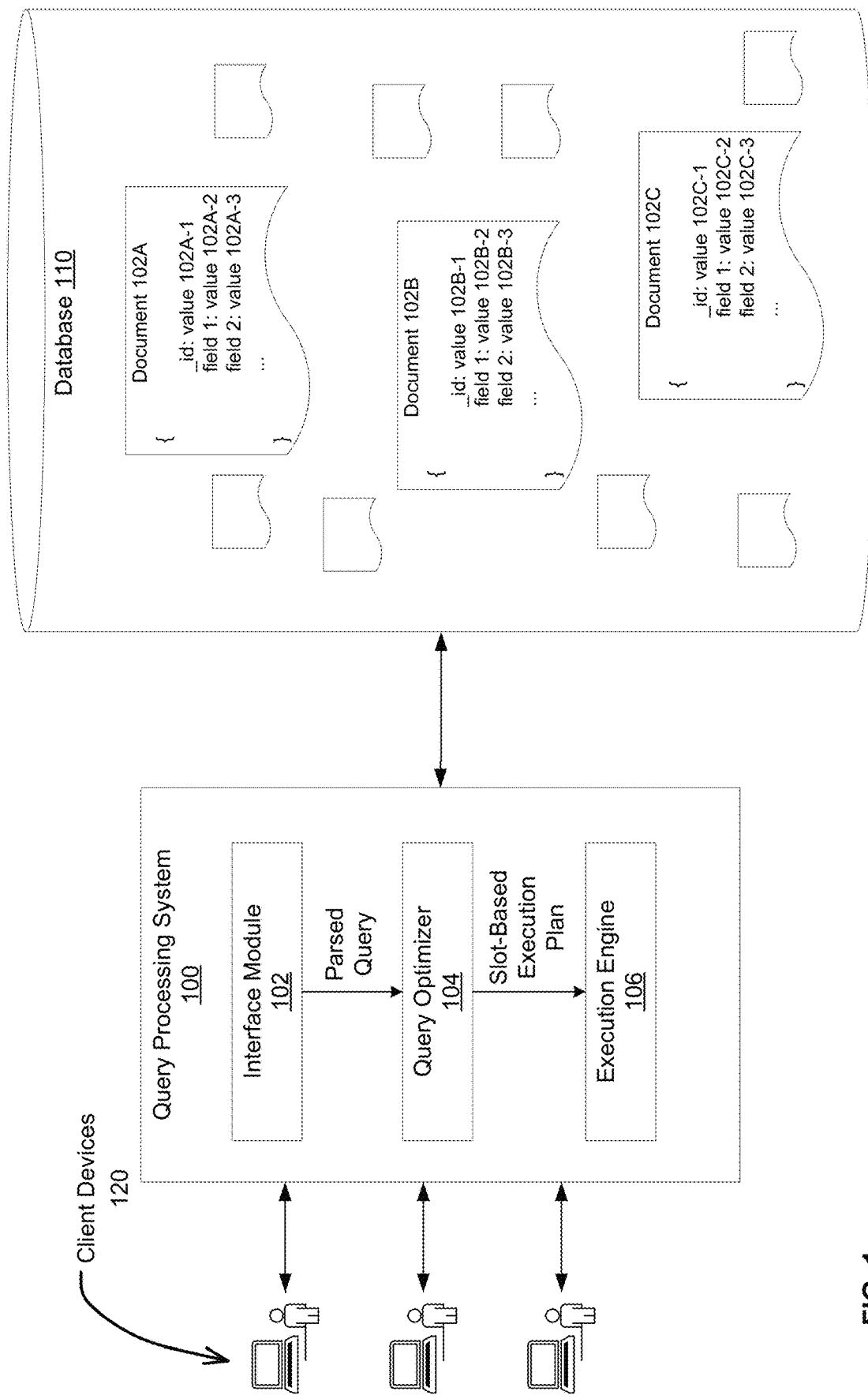
FIG. 1 shows a diagram of an example environment in which some embodiments of the technology described herein may be implemented.

Described herein are embodiments of a query processing system that optimizes received queries to generate an optimized slot-based execution (SBE) plan. The query processing system executes SBE plan to obtain data for responding to the query.

A query processing system may process queries for data stored in a database. The query processing system may receive queries from client devices (e.g., submitted by a user through a graphical user interface (GUI) and/or by a software application through an application program interface (API)). The query processing system executes the queries against the database to obtain data, and outputs the data to the client devices.

The inventors have developed techniques of processing queries against a database that allow the queries to be executed more efficiently. The techniques described herein process a query by optimizing the query to generate an optimized SBE execution plan. A query processing system may be configured to execute the query by executing the SBE plan to improve the speed of executing the query. The techniques optimize a given query by generating a logical representation that indicates operations to be executed to obtain data requested by the query. The techniques optimize the logical representation by modifying and/or reorganizing the operations such that they can be executed more efficiently (e.g., more quickly). The techniques then translate the optimized logical representation into an SBE plan that is executed to generate a query output.

In conventional query processing systems, entire data objects (e.g., binary encoded JavaScript Object Notation (BSON) documents in a MongoDB database) are passed between different stages that are performed as part of processing a query. For example, the execution of a query may involve multiple filtering stages, and data objects obtained from performing one filtering stage may be passed to a subsequent filtering stage. The inventors recognized that it is unnecessary to pass entire document objects of a database between stages of query execution. In many cases, a stage requires only certain values from data objects identified in a previously executed stage.

Some embodiments provide a query processing system that optimizes a query by reducing and/or eliminating transmission of data objects (e.g., BSON documents) between stages of processing the query. The optimization techniques allow for individual values from data objects to be transmitted between stages instead of entire data objects. This reduces the amount of data exchanged during the execution of a query and thus allows the query to be executed more quickly with fewer memory resources.

The inventors further recognized that conventional query processing systems are inefficient in executing queries against non-relational or schema-less databases (e.g., against a MongoDB database). Different data objects may store data using a variety of data structures that do not adhere to any pre-defined format. Data stored in different structures may also be referred to as "polymorphic". For example, different documents may store values of a field in different formats. To illustrate, a first field in a first document may store an array as a value and a second field in a second document may store a nested object as a value. Conventional techniques typically process polymorphic data by restructuring the data into a uniform format. For example, conventional techniques may flatten data in an array or nested object. This, however, adds additional processing steps (e.g., to reformat data) during the execution of a query and thus degrades performance of the execution. Further, conventional techniques cannot be optimized for a particular data structure that is processed in a query.

Some embodiments provide a query processing system that can more efficiently execute a search on non-relational or schema-less data. The query processing system includes operators that are customized to search different types of data structures. For example, the query processing system may have one operator that traverses elements of an array and another operator that accesses a single value from a field. This allows the query processing system to adjust its search operations based on the data structure encountered while executing a query. For example, the query processing system may determine to traverse an array or nested object stored in a field of a data object without having to reformat (e.g., flatten data in the field).

Accordingly, some embodiments provide a system for executing queries against a database. The system may be configured to receive queries from one or more client devices. The system may be configured to optimize a given query by: (1) generating a logical representation of the query; (2) optimizing the logical representation of the query to obtain an optimized logical representation of the query that indicates an execution plan; and (3) translating the optimized logical representation of the query into an SBE plan. The system may be configured to execute the SBE plan against the database to obtain data and output the data (e.g., to a client device that transmitted the query).

FIG. 1 shows a diagram of an example environment in which some embodiments of the technology described herein may be implemented. As shown in the example embodiment of FIG. 1, the environment includes a query processing system 100, a database 110, and client devices 120. The query processing system 100 receives queries from client devices 120 and executes them against the database 110 to obtain data requested by the queries. The query processing system 100 outputs the data to the client devices 120.

In some embodiments, the database 110 may be a distributed database comprising multiple computing devices (e.g., servers) and storage hardware (e.g., storage disks). For example, the distributed database may include geographically distributed servers and storage disks. In some embodiments, the database 110 may be a non-relational, NoSQL, or schema-less database. For example, the database 110 may be a MongoDB database. The database 110 may have a flexible data model that allows the storage of unstructured data. Although the database 110 is shown as a single entity in the example of FIG. 1, in some embodiments, the database 110 may include multiple partitions (e.g., shards) and/or replica sets of data.

As illustrated in the example embodiment of FIG. 1, the database 110 may be configured to store data in data objects called documents, including documents 102A, 102B, 102C. A document may store data as values of one or more fields. A value of a field can be stored in various data structures such as another document, an array of values, an array of documents, a nested document, and/or another suitable data structure. In some embodiments, documents may each include an object identifier field (e.g., _id) that uniquely identifies the document. In the example embodiment of FIG. 1, document 102A includes a value 102A-1 for the _id field, value 102A-2 for field 1, and value 102A-3 for field 2. Document 102B includes a value 102B-1 for the _id field, a value 102B-2 for field 1, and a value 102B-3 for field 2. Document 102C includes a value 102C-1 for the _id field, a value 102C-2 for field 1, and a value 102C-3 for field 2.

In some embodiments, a document may be stored as a particular file type. In some embodiments, a document may be stored as a binary-encoded JavaScript Object Notation (BSON) file. In some embodiments, a document may be stored as a JavaScript Object Notation (JSON) file. In some embodiments, a document may be stored as a text file. In some embodiments, a document may be stored as a comma-separated values (CSV) file. In some embodiments, a document may be stored as another suitable file type.

As shown in the example embodiment of FIG. 1, the query processing system 100 includes an interface module 102, a query optimizer 104, and an execution engine 106. The interface module 102 parses a received query and provides the parsed query to the query optimizer 104. The query optimizer 104 generates a slot-based execution (SBE) plan that is executed by the execution engine 106 against the database 110 to obtain data from the database with which to respond to the query. The interface module 102 may be configured to transmit data obtained from execution of queries to the client devices 120.

The interface module 102 may be configured to receive queries from client devices 120. In some embodiments, a query may be a textual query. The query may include various operators that specify one or more conditions and/or operations for identifying and/or modifying data in the database (e.g., write, read, update, and/or delete operations). For example, the query may be a MongoDB Query Language (MQL) query specifying condition(s) and/or operations. Some embodiments may be configured to receive queries in other languages in addition to or instead of MQL queries.

In some embodiments, the interface module 102 may be configured to parse a received query to obtain a parsed query. The interface module 102 may be configured to parse the query by generating a parse tree. The interface module 102 may be configured to provide the parse tree to the query optimizer 104 (e.g., for generation of an SBE plan). For example, the interface module 102 may generate a concrete syntax tree (CST) that the interface module 102 provides to the optimizer module 104. In some embodiments, the interface module 102 may be configured to use a parser generator (e.g., the GNU Bison parser generator) to determine whether a query conforms to a defined grammar according to which the query is parsed.

As illustrated in the example embodiment of FIG. 1, the query optimizer 104 receives a parsed query from the interface module 102. The query optimizer 104 may be configured to optimize the parsed query to generate an SBE plan for execution of the query against the database 110.

In some embodiments, the query optimizer 104 may be configured to generate a logical representation of a received parsed query. The query optimizer 104 may be configured to use the logical representation to optimize the query. In some embodiments, the query optimizer 104 may be configured to convert a parsed query into a logical representation comprising an abstract binding tree (ABT). The ABT may be used as a model of the query that can be modified and/or rewritten (e.g., such that the query can be executed more quickly).

In some embodiments, an ABT may comprise various components including nodes, expressions, and paths. Nodes may represent operations such as data accesses and/or relational operators (e.g., inner join, group by). Nodes may have children that are other nodes or expressions. Expressions may indicate a constant value, a variable, or a function call. In some embodiments, an expression may hold another expression or a path as a child, but not a node. Paths may be a set of operations that may be used to access data from the database. For example, paths may be operations that are used to access values of fields stored in documents of the database 110. Example path operations include PathIdentity which returns a value to which it is applied unmodified. As another example, a PathGet extracts a value of a field by name and then performs an operation with the value. As another example, Path Traverse applies an operation to each element of an array. PathTraverse may traverse elements of an array. As another example, PathCompare may compare a value accessed from a field to another value (e.g., to determine whether it is greater than, less than, or equal to the other value).

In some embodiments, the query optimizer 104 may be configured to optimize a logical representation of a query to generate an optimized logical representation indicating an execution plan. For example, the query optimizer 104 may optimize a logical ABT to generate an optimized ABT (also referred to herein as a "physical ABT"). The optimized logical representation may indicate a plan according to which a query is to be executed.

In some embodiments, the query optimizer 104 may be configured to optimize a logical representation of a query by modifying how data is accessed from documents in the database 110. The query optimizer 104 may be configured to modify operations to account for different types of data structures that may be stored in fields of the documents. In some embodiments, the query optimizer 104 may be configured to modify path operations in an ABT. For example, the query optimizer 104 may modify a path operation such that it traverses elements of an array encountered as a value of a field in a document. In some embodiments, the query optimizer 104 may be configured to use paths to model portions of a query (e.g., expressions, match expressions, projections, and/or other portions of a query).

In some embodiments, the query optimizer 104 may be configured to optimize a logical representation of a query by modifying the logical representation such that entire documents are not transmitted between stages of the query. The query optimizer 104 may be configured to modify the logical representation such that values of documents are transmitted between stages instead of entire documents. In some embodiments, the query optimizer 104 may be configured to introduce additional variables holding field values that can be transmitted or otherwise accessible to a subsequent stage.

In some embodiments, the query optimizer 104 may be configured to perform optimization using the cascades framework for query optimization. For example, the query optimizer 104 may use the cascade framework for query optimization described in "The Cascades Framework for Query Optimization" by Goetz Graefe in Vol. 18 No. 3 of the Bulletin of the Technical Committee on Data Engineering published in September 1995.

In some embodiments, the query optimizer 104 may be configured to optimize a logical representation of a query using a cost model. The query optimizer 104 may be configured to generate multiple different optimized logical representations (e.g., physical ABTs) indicating execution plans and determine a cost metric for each of the execution plans. In some embodiments, the query optimizer 104 may be configured to determine a cost metric as a floating point value approximating a query latency associated with an execution plan. In some embodiments, the query optimizer 104 may be configured to determine a cost based on multiple metrics in addition to or instead of query latency such as disk IO, memory footprint, network bandwidth, or time to first result. For example, the query optimizer 104 may compute a cost vector with values for each of multiple metrics.

In some embodiments, the query optimizer 104 may be configured to determine a cost for an execution plan by determining a number of items that are processed by each node in an optimized logical representation (e.g., a physical ABT) indicating the execution plan. In some embodiments, the query optimizer 104 may be configured to maintain a sample of each collection in the database 110. The query optimizer 104 may execute sample sets of operations over each sample to infer selectivity and cardinality estimates for the collections. The query optimizer 104 may be configured to extrapolate the results of executed operations on the samples based on sizes of the collections. In some embodiments, the query optimizer 104 may be configured to determine cardinality using max Diff histograms. In some embodiments, the query optimizer 104 may be configured to use a data guide to statistically estimate cardinality. For example, the query optimizer 104 may use a data guide as described in "Closing the functional and Performance Gap between SQL and NoSQL" published by the Association for Computing Machinery in SIGMOD '16: Proceedings of the 2016 International Conference on Management of Data on Jun. 14, 2016.

In some embodiments, the query optimizer 104 may be configured to translate an execution plan (e.g., selected from among multiple execution plans based on associated costs) into an SBE plan that can be executed by the execution engine 106. An SBE plan may comprise a tree of nodes called plan stages, slots, and expressions. Example plan stages include document scan (e.g., of a collection in the database 110), an index scan (e.g., of an index for a collection in the database 110), union, nested loop join, limit, hash, aggregation, and/or other operations.

In some embodiments, each stage of an SBE plan may include one or more slots that hold values. A slot may be identified by a slot ID. A slot may further be configured with ownership semantics indicating whether it owns certain values and/or view certain values from other slots. In some embodiments, a slot may have visibility semantics that dictate visibility of the slot to other stages. The visibility semantics may limit visibility of a slot by one or more stages in an SBE plan. For example, a stage for computing a hash-based group-by may be configured such that slots in the stage's descendent stages cannot be accessed by the stage's ancestor stages. In some embodiments, slots may be correlated. A slot define by a child branch may be visible to another child branch. For example, in a nested loop join stage, any correlated slots from an outer side of the loop may be able to access an inner portion of the loop join.

In some embodiments, an SBE plan stage may have one or more expressions for performing computations. An expression may be evaluated for each value accessed in the stage. The values resulting from evaluation of the expressions may be stored in slots of the stage. In some embodiments, expressions may include constants, variables, unary primitives, binary primitives, and/or function calls. In some embodiments, a function expression may hold a name of a function that can be called as a string. Example expressions include expressions that determine a day of year, day of month, day of week, a split, defining a new array, ceil, floor, absolute value, log, cosine, sine, hash, and/or other expressions. In some embodiments, expressions may be added for use by the query optimizer 104 to generate SBE plans. In some embodiments, an expression may be represented as a tree of nodes. An expression may be compiled at runtime into byte code for evaluation (e.g., by a virtual machine that executes the bytecode).

As shown in the example embodiment of FIG. 1, the execution engine 106 may be configured to execute an SBE plan provided by the query optimizer 104. In some embodiments, the execution engine 106 may be an SBE engine configured to execute SBE plans.

In some embodiments, the execution engine 106 may be configured to execute an SBE plan by executing each stage of the SBE plan. In some embodiments, the execution engine 106 may be configured to sequentially execute the stages such that information (e.g., values extracted from document field(s)) in one stage may be used in a subsequent stage requiring the information. In some embodiments, the execution engine 106 may be configured to perform stages in parallel (e.g., where the stages do not depend on values from one another).

In some embodiments, the execution engine 106 may be configured to execute an SBE plan using a virtual machine hosted by a computing device. The execution engine 106 may be configured to request instantiation of a virtual machine (e.g., on a server) and use the virtual machine to execute the SBE plan. For example, the execution engine 106 may request a virtual machine in response of receipt of an SBE plan and execute the SBE plan using the virtual machine.

In some embodiments, the execution engine 106 may be configured to pass field values between stages of an SBE plan during execution instead of passing entire data objects (e.g., documents) storing the field values. Accordingly, the execution engine 106 may not pass documents between stages. The execution engine 106 may execute an SBE plan more efficiently than other types of plans as the execution engine 106 does not need to pass entire documents between stages, and may instead only pass values. This reduces the amount of data processed in each stage, and thus makes plan execution more efficient. In some embodiments, an SBE value may be a number such as an integer (e.g., a 64-bit integer). In some embodiments, an SBE value may include a tag for interpreting the value. For example, the SBE value may include an 8-bit tag value for interpreting the SBE value. In some embodiments, an SBE value for a data object (e.g., a document) may be a reference (e.g., a pointer) to the data object.

In some embodiments, the execution engine 106 may be configured to execute an SBE plan using an iterator based pull model. The execution engine 106 may be configured to execute a method at each stage of the SBE plan that advances an iterator to a subsequent data object (e.g., document) to be processed in the stage.

In some embodiments, the client devices 120 may be any suitable computing devices. For example, the client devices 120 may include desktop computers, mobile devices (e.g., laptops, smartphones, tablets, wearable devices, and/or other mobile devices), servers, and/or other computing devices. In some embodiments, the client devices 120 may be configured to transmit queries to the query processing system 100 to request and/or modify data in the database 110. For example, the query processing system 100 may receive a query through a GUI presented on one of the client devices 120. As another example, the query processing system 100 may receive a query through an application program interface (API). In some embodiments, the client devices 120 may programmatically generate queries and transmit the queries to the query processing system 100 (e.g., as part of execution a software application program). For example, a software application program may cause a client device to transmit a query to the query processing system 100 to retrieve data.

Figure 2:
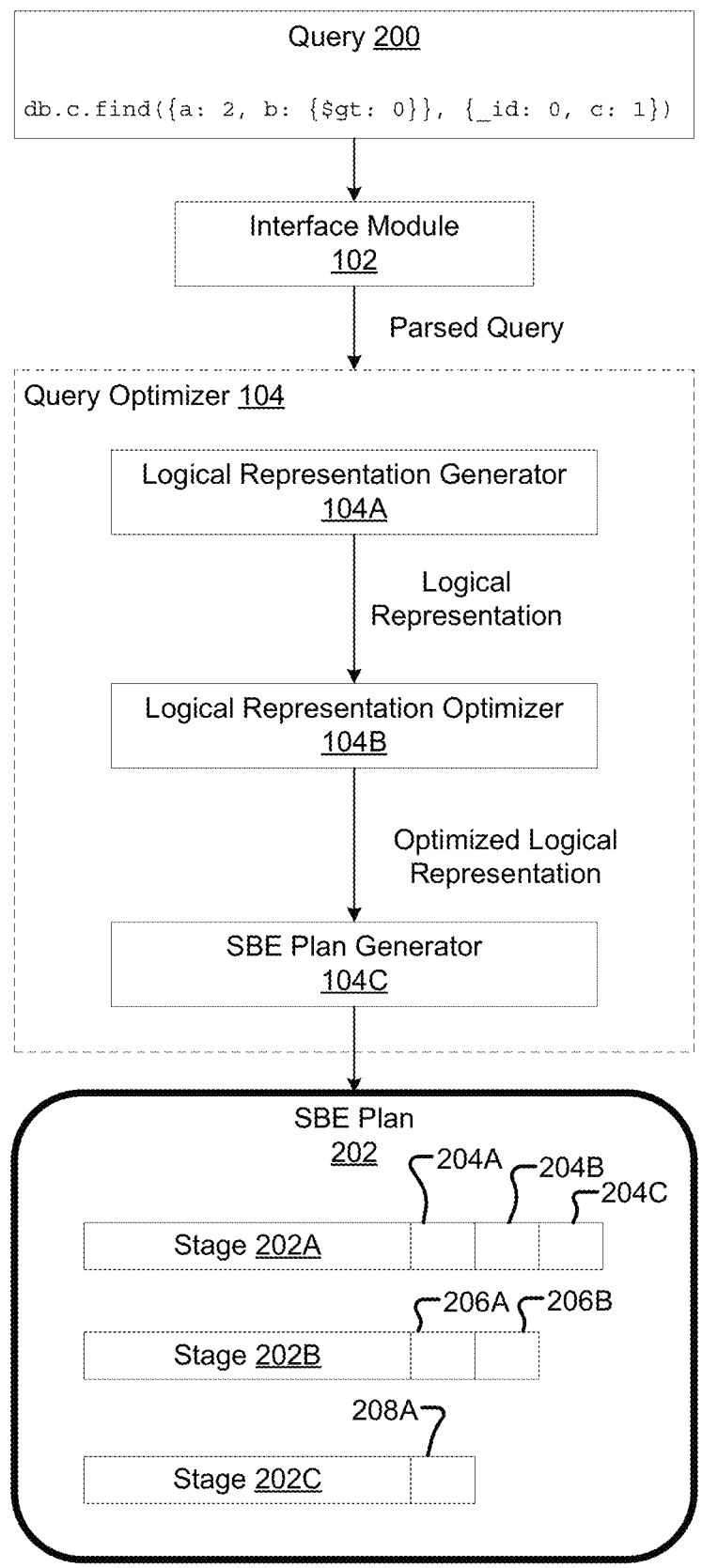
FIG. 2 illustrates processing of a query to obtain a slot-based execution (SBE) plan, according to some embodiments of the technology described herein.

FIG. 2 illustrates processing of a query 200 to obtain a slot-based execution (SBE) plan, according to some embodiments of the technology described herein. As shown in FIG. 2, the interface module 102 of the query processing system 100 receives the query 200 (e.g., from a client device through a communication network). In the example of FIG. 2, the query is requesting documents from the collection "c" where the field "a" has a value of 2 and the field "b" has a value greater than or equal to 0. The object resulting from identifying the documents is assigned an "_id" field value of 0 and a value of the field "c" as 1.

As shown in FIG. 2, the interface module 102 parses the query 200 and outputs the parsed query to the query optimizer 104 of the query processing system 100. In some embodiments, the interface module 102 may parse the query 200 by processing characters of the query's 200 string to recognize one or more commands therein. The interface module 102 may recognize a command by identifying keywords and/or identifiers. In this example, the interface module 102 identifies the command "find" indicating a command to search for documents that meet criteria indicated by expression(s) in a first argument of the "find" command. The interface module 102 further identifies a second argument of the "find" command indicating to assign an object resulting from the an "_id" of 0 a field "c" with a value of 1.

As illustrated in FIG. 2, the query optimizers 104 includes multiple components that operate to obtain an SBE plan for execution (e.g., by the execution engine 106 of the query processing system 100 described herein with reference to FIG. 1). The components of the query optimizer 104 include a logical representation generator 104A, a logical representation optimizer 104B, and an SBE plan generator 104C.

As shown in FIG. 2, the logical representation generator 104A generates a logical representation of the parsed query. For example, the logical representation generator 104A may generate an ABT as the logical representation of the parsed query. An example ABT generated for the parsed query of FIG. 2 is shown below.

```
Root [ ]
|  |  projections:
|  |     combinedProjection_0
|  RefBlock:
|     Variable [combinedProjection_0]
Evaluation [ ]
|  BindBlock:
|     [combinedProjection_0]
|        EvalPath [ ]
|           |  Const [{ }]
|        PathField [c]
|        PathConstant [ ]
|        Variable [fieldProj_0]
...
Filter [ ]
|  EvalFilter [ ]
|  |  Variable [scan_0]
|  PathComposeM [ ]
|  |  PathGet [b]
|  |  PathTraverse [ ]
|  |  PathCompare [Gt]
|  |  Const [0]
|  PathGet [a]
|  PathTraverse [ ]
|  PathCompare [Eq]
|  Const [2]
Scan [c__bd6d1116-6b18-4393-9658-400c5176b981]
   BindBlock:
      [scan_0]
Source [ ]
```

In the example ABT above, the bottom node is a logical scan of the collection "c". The ABT may be read from bottom up as follows. The "BindBlock" indicates that the documents produced by the scan are being associated to a variable named "scan_0". Above the scan, there is a filter node which models the match expression "{a: 2, b: {$gt: 0}}". The filter's first child is the "Scan", and its second child is the "EvalFilter". The first child of the "EvalFilter" is a path, and the second child of the "Evalfilter" is an ABT which the filter should be allowed to. In this example, the path is a composition of two sub-paths: one for "a: 2" and one for "b: {$gt: 0}". The array traversals are explicit in the paths. These paths are evaluated over the "scan_0" variable. The "Evaluation" node of the ABT performs a computation that assigns the results of the query to a variable. In this example, it assigns the object resulting from query projection "{id_: 0, c: 1}" to the "combinedProjection_0" variable. The special "Root" node indicates that "combinedProjection_0" is returned as the result of the query.

As shown in FIG. 2, the logical representation optimizer 104B optimizes the logical representation of the query 200 generated by the logical representation generator 104A. In embodiments in which the logical representation is an ABT, the logical representation optimizer 104B may generate a physical ABT representing an execution plan determined by the logical representation optimizer 104B. The logical representation optimizer 104B may replace logical ABT nodes with physical nodes.

In some embodiments, the logical representation optimizer 104B may determine one or more cost metrics for the query 200 using the logical representation. In some embodiments, the logical representation optimizer 104B may determine the cost metric(s) using a cost model. The logical representation optimizer 104B generate a cost model by running experiments to quantify values of various query operations. For example, the logical representation optimizer 104B may determine a value of the average cost of logical representation 104B may use maxDiff histograms to determine a cardinality estimate of a collection. In some embodiments, the logical representation 104B may use a data guide for optimization in a schema-less context.

Below is an example of a physical ABT that may be generated by the logical representation optimizer 104B using the above example ABT generated by the logical representation generator 104A.

```
Root [cost: 115.414, adjustedCE: 2.02]
|  |  projections:
|  |     combinedProjection_0
|  RefBlock:
|     Variable [combinedProjection_0]
|
Evaluation [cost: 115.414, adjustedCE: 2.02]
|  BindBlock:
|     [combinedProjection_0]
|        EvalPath [ ]
|         |  Const [{ }]
|        PathField [c]
|        PathConstant [ ]
|        Variable [fieldProj_0]
|
BinaryJoin [joinType: Inner, {rid_1}, cost: 115.01, adjustedCE: 2.02]
|  |  Const [true]
|  |
|  Filter [cost: 12.81, adjustedCE: 2.02]
|  |  EvalFilter [ ]
|  |  |  Variable [evalTemp_2]
|  |  PathTraverse [ ]
|  |  PathCompare [Gt]
|  |  Const [0]
|  LimitSkip [ ]
|  |  limitSkip: [ ]
|  |     limit: 1
|  |     skip: 0
|  Seek [ridProjection: rid_1, {'b': evalTemp_2, 'c': fieldProj_0}, c]
|  |  BindBlock:
|  |     [evalTemp_2]
|  |        Source [ ]
|  |     [fieldProj_0]
|  |        Source [ ]
|  RefBlock:
|     Variable [rid_1]
|
IndexScan [{'<rid>': rid_1}, scanDefName: c, indexDefName: a_1, interval:
{['Const [2]', 'Const [2] ']}, no dedup, cost: 0.8, adjustedCE: 4] BindBlock:
         [rid_1]
Source [ ]
``` seeking a cursor in a record store. To illustrate, the logical representation optimizer 104B may use the cost model to determine a cost metric that is a floating point number indicating the query latency. As another example, the logical representation optimizer 104B may use the cost model to determine a cost metric comprising multiple metrics (e.g., stored in a vector) such as disk input/output (IO), memory footprint, network bandwidth, query latency and/or time to first result.

In some embodiments, the logical representation optimizer 104B may use a cardinality estimation subsystem which is configured to estimate a number of items that will be processed by each ABT node. In some embodiments, the logical representation optimizer 104B. In some embodiments, the logical representation optimizer 104B may maintain a sample of each of one or more collections in the database 110. The logical representation 104B may run predicates over a sample of a given collection to infer its selectivity. The logical representation 104B may determine a cardinality estimate of the collection using the selectivity and the size of the collection. In some embodiments, the As shown in the example physical ABT above, in some embodiments, the logical representation optimizer 104B may output a determined cost. The physical ABT replaces the logical "ScanNode" with a selected data access path. In this case, the plan is an "IndexScan" which produces the "rid_1" variable. The "rid_1" variable is specified as correlated in the "BinaryJoin" node, and is fed to the "Seek" node in order to access full documents from the "RecordStore". The predicate "{a: {$eq: 2}}" is sargable, so it is evaluated by virtue of scanning only the corresponding index keys. The predicate "{b: {$gt: 0}}" is not sargable so it is evaluated with an explicit "Filter" node.

As shown in FIG. 2, the optimized logical representation (e.g., a physical ABT) is provided to the SBE plan generator 104C. The SBE plan generator 104C generates SBE plan 202 for execution of the query 200. SBE-based query processing has advantages including that it is generic to multiple query languages, its operators are well-defined making them easier for developers to understand, and is faster. SBE-based query processing is faster because it eliminates unnecessary intermediate document materialization during execution. SBE-based query processing uses a simpler data representation with less copying of data.

As illustrated in FIG. 2, in some embodiments, the SBE plan generator 104C generates an SBE plan 202 that includes multiple stages 202A, 202B, 202C. In some embodiments, the SBE plan generator 104C may generate the SBE plan 202 as a tree comprising nodes. The nodes may represent stages of the plan. For example, the stage 202A may be represented by a scan operation node, stage 202B may be represented by an index scan operation node, and the stage 202C may be represented by a union operation node. Other example operations include nested loop join, limit, hash aggregation, and/or other operations that may be executed as part of a query.

In some embodiments, the SBE plan generator 104C is value-oriented. The SBE plan generator 104C may generate the SBE plan 202 to provide values during execution. For example, an SBE value may be a 64-bit integer with an 8-bit type tag for interpretation of the value. In this example, narrow types such as numbers, dates, or small strings may be stored as a 64-bit value. Wider types such as BSON documents or long strings, an SBE value may be a pointer to the data. In some embodiments, an SBE value may be represented using BSON.

As shown in FIG. 2, in some embodiments, each of the stages 202A, 202B, 202C of the SBE plan 202 may have one or more slots. A slot of a stage may hold an SBE value (e.g., produced during execution of the stage). In the example of FIG. 2, stage 202A has slots 204A, 204B, 204C; stage 202B has slots 206A, 206B; and stage 202C has slot 208A. In some embodiments, each slot may have a slot identifier. In some embodiments, a slot may be configured to store own its own value or may have a view into a value owned by another slot. In some embodiments, a slot may be visible to all ancestor stages in the SBE plan 202. For example, slot 206A may be visible to stage 202A In some embodiments, a stage may be configured to block visibility of a slot of the stage. For example, a stage for computing a hash-based group-by may block visibility of its slots to other stages. Ancestor stages may only access output slots defined by the hash-based group-by stage. In some embodiments, SBE nodes may use correlated slots. A correlated slot may be a slot defined by a child branch of an SBE node that is visible to other child branches of the SBE node. For example, a nested loop join stage of an SBE plan may have correlated slots for the outer side of the loop join that can be accessed on the inner side of the loop join.

In some embodiments, an SBE plan stage may have expressions for performing computations. For example, the SBE plan stage may have one or more child expressions. For each input to the stage, these expression(s) are evaluated and results of the evaluation(s) are stored in corresponding slot(s). Example expressions may include constants, variables, unary primitives, binary primitives, and/or function calls. A function expression may hold the name of a function being called as a string. For example, values produced from execution of stage 202A may be stored in slots 204A, 204B, 204C. Values produced from execution of stage 202B may be stored in slots 206A, 206B. Values produced from execution of stage 202C may be stored in slot 208A.

In some embodiments, the SBE plan generator 104C may represent expressions in the SBE plan 202 as trees of nodes. The trees may be compiled into executable instructions (e.g., bytecode). In some embodiments, runtime expressions are evaluated using a virtual machine that executes the instructions (e.g., the bytecode).

Below is an example of the SBE plan 202 generated by the SBE plan generator 104C using the physical ABT described above.

```
project [s6 = if (exists (s4) || isObject ({ }), setField ({ }, "c", s4), { })]
nlj [ ] [s1]
    left
        nlj [ ] [s2, s3]
            left
                project [s3 = ks (<low>)]
                project [s2 = ks (<high>)]
                limit 1
                coscan
            right
                ixseek low=s2 high=s3 rid=s1 @"c" @"a_1"
    right
        filter {traverseF (s5, \ l101.0 . l101.0 <=> 0 > 0, false)}
        limitskip 1 0
        seek rid=s1 [s4 = c, s5 = b] @"c"
```

The above SBE plan uses an index "{a: 1}" to find all documents satisfying "{a: {$cq: 2}}". The SBE plan fetches those documents from the collection and then applies the filter "{b: {$bt: 0}}" and then performs the projection "{_id: 0, c: 1}".

In some embodiments, the SBE plan may be read from the bottom of the tree to the top. The SBE plan begins with the innermost "nlj" (i.e., the nested loop join) stage. The left (or "outer") branch of this "nlj" stage will run just once due to the "limit 1" in the stage. The two project stages fill out slots "s2" and "s3" with the low and high bounds of the index scan respectively. The "[s2, s3]" listed alongside this "nlj" stage indicate that the slots are correlated, so their values are visible to the right (or "inner") branch. The "ixseek" stage on the inner side runs until EOF, producing a stream of record id values in the slot "s1". The record id slot "s1" is listed as a correlated slot of the upper "nlj" stage higher in the tree. For each record id placed into the slot "s1", the "seek" stage will run. The "seek" stage will find the record in the collection with the record id given by "s1", extracting fields "c" and "b" from the resulting documents into slots "s4" and "s5" respectively. The "filter" stage then evaluates a predicate over the slot "s5", effectively applying the predicate "{b: {$gt: 0}}". Note that as in ABT, array traversal is explicit: the "traverse" expression will apply the >0 lambda across all array elements if the slot "s5" is an array. Finally, the "project" stage evaluates an expression which places documents such as {c: <val>} into the slot "s6". At a higher level, the system executing the SBE tree may read the results of the query from slot "s6".

Figure 3:
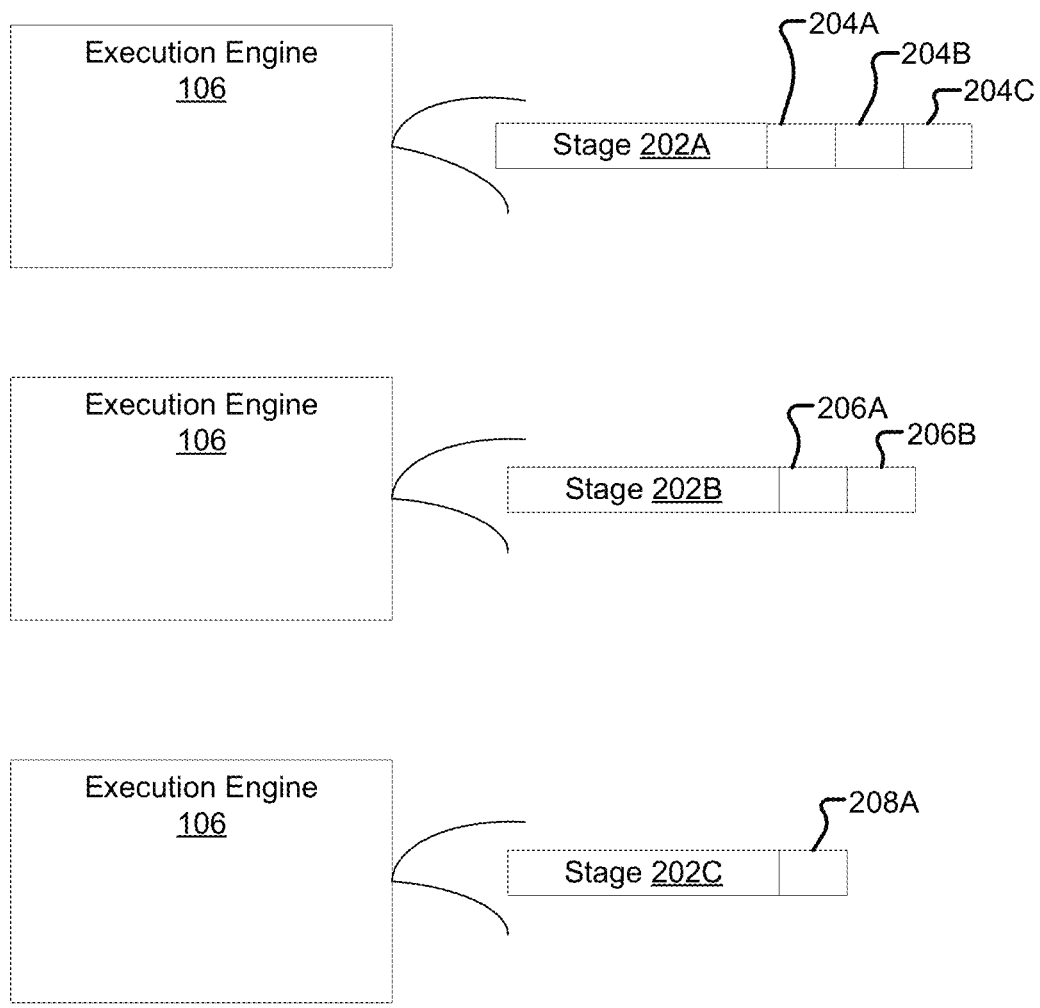
FIG. 3 illustrates execution of stages of an SBE plan, according to some embodiments of the technology described herein.

FIG. 3 illustrates execution of stages of the SBE plan 202 generated by the SBE plan generator 104C, according to some embodiments of the technology described herein. As shown in FIG. 3, the execution engine 106 executes stage 202A. The stage 202A may include multiple portions (e.g., expressions) that, when executed, produce corresponding values. The execution engine 106 may store a value obtained from each portion in its corresponding slot. The execution engine 106 may subsequently execute stage 202B. For example, the execution engine 106 may access values from slots 204A, 204B, 204C and use them to execute the stage 202B. The execution engine 106 may store values generated during execution of the stage 202B in slots 206A, 206B. The execution engine 106 may then execute stage 202C. The execution engine 106 may store a value generated during execution of stage 202C in slot 208A. In some embodiments, the value stored in slot 208A may be a response to a query (e.g., query 200).

Figure 4:
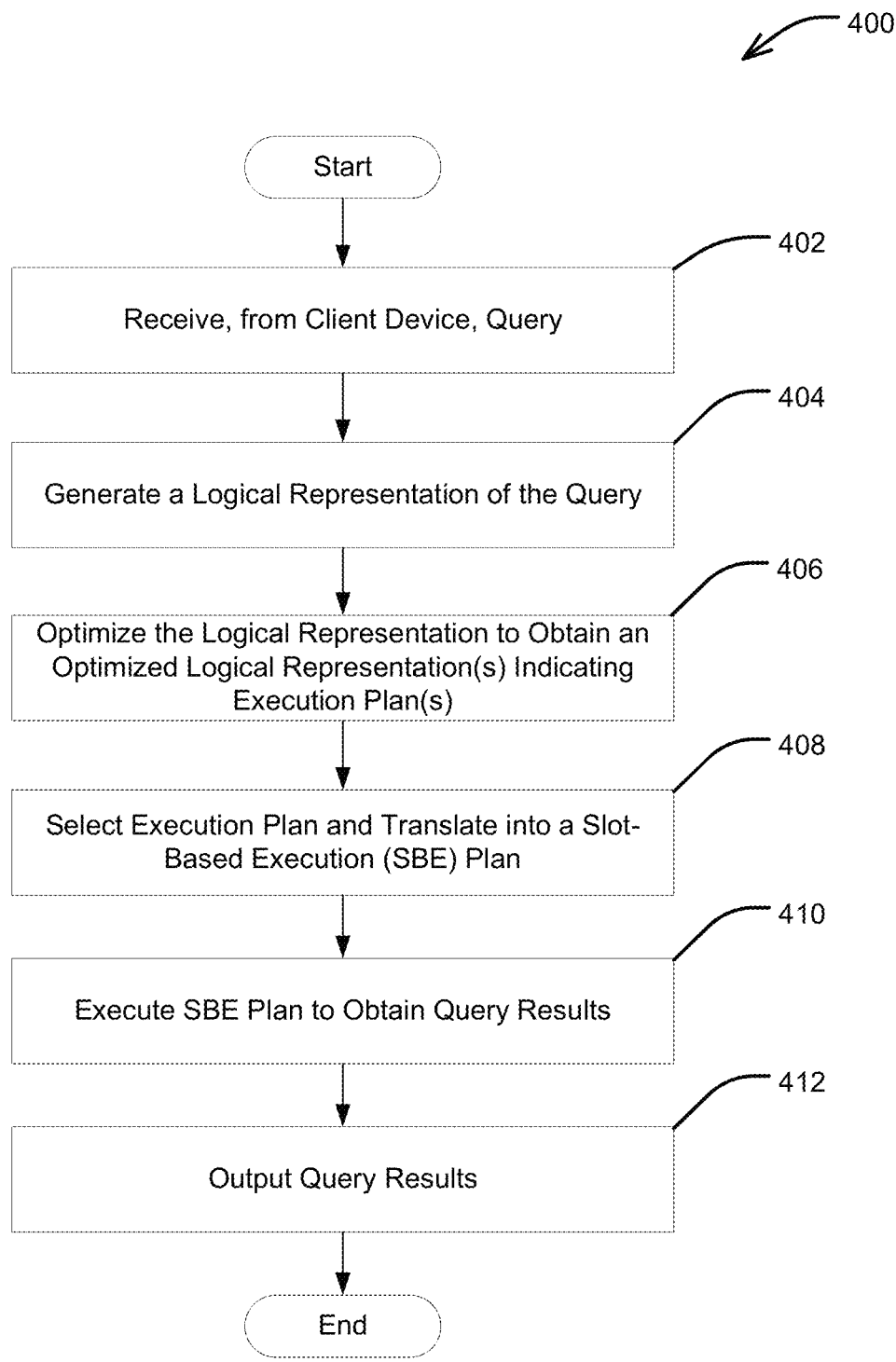
FIG. 4 is a flowchart of an example process for executing a query against a database, according to some embodiments of the technology described herein.

FIG. 4 is an example process 400 of executing a query against a database, according to some embodiments of the technology described herein. In some embodiments, the process 400 may be performed by the query processing system 100 described herein with reference to FIG. 1. For example, the process 400 may be performed by the query processing system 100 in response to receiving a query from one of the client devices 120.

Process 400 begins at block 402, where the system receives, from a client device, a query. In some embodiments, the query may be a textual query. For example, the query may be a MQL query. The query may request data stored in the database and/or indicate updates to data in the database.

Next, process 400 proceeds to block 404, where the system generates a logical representation of the query. The system may be configured to generate the logical representation of the query by: (1) parsing the query to obtain a parsed query (e.g., a CST); and (2) generating the logical representation using the parsed query. In some embodiments, the system may be configured to generate an AST as the logical representation using the parsed query. In some embodiments, the logical representation may be a linear model in which the query is represented as a sequence of stages. In some embodiments, the system may be configured to use metadata. For example, the system may use available indexes to generate the logical representation of the query.

Next, process 400 proceeds to block 406, where the system optimizes the logical representation (e.g., an AST) of the query to obtain one or more optimized logical query representations (e.g., physical AST(s)). In some embodiments, the system may be configured to rewrite the logical representation prior to applying optimizations. Rewriting may involve substituting nodes of the logical representation. The system may be configured to substitute nodes of the logical representation such that field values are passed between stages instead of entire data objects (e.g., documents). For example, the system may substitute a PathKeep operator which accesses an entire document with PathField and PathGet operators to access values from the document. This reduces the amount of data that needs to be passed to a subsequent stage of the query.

In some embodiments, the system may be configured to rewrite the logical representation by organizing nodes of the logical representation into a different structure. For example, the system may collect evaluation and filter nodes in the logical representation and store them into a structure called a sargable node. An example such node is described herein. The structure may compactly represent a sequence of filter and evaluation nodes. In some embodiments, the system may be configured to reorganize portions of the logical representation to allow the portions to be processed using an index instead of scanning the data objects themselves. Use of the index may allow the processing to be performed more quickly as it requires less data to be accessed as part of the processing.

In some embodiments, the system may be configured to optimize the rewritten logical representation by generating multiple optimized logical representations indicating respective execution plans (e.g., multiple physical ASTs). In some embodiments, the system may be configured to use a cascade query optimization framework to determine an optimal plan. The system may be configured to determine a cost metric for each plan or each of multiple groups of plans. For example, the system may estimate a cardinality for different plans. In some embodiments, the system may be configured to determine a best plan (e.g., lowest cardinality) of each group of plans, and selects the optimal plan from the collected plans.

In some embodiments, the system may be configured to optimize a logical representation by modifying operations (e.g., Path operations) based on a data type stored in a data object field. For example, the system may modify an operation to traverse elements of an array when the array is accessed. As another example, the system may modify an operation to traverse nested objects stored in a field when the field is accessed in the query. Accordingly, the system generates a plan that is configured to process polymorphic data (e.g., data of different structures) in its stored data structure instead of reformatting the data.

In some embodiments, the system may be configured to encode different conditions based on which the system identifies an optimal plan. The system may be configured to select an optimal plan for the conditions. Example conditions include a sorting requirement, a requirement of using an index, a requirement of using a collection scan, and/or a combination thereof.

In some embodiments, the system may be configured to translate an optimal plan into an executable plan. The system may be configured to translate the optimal plan into an SBE plan. Each stage of the SBE plan may implement various evaluation operations (e.g., hash, join, aggregate, sort, filter, and/or other operations). The stages may include expressions for executing the evaluation operations. The SBE stages include slots that hold values produced during the stages (e.g., that are accessible by other stages as variables). Values obtained from execution of a stage may be accessible by other stages operations.

Next, process 400 proceeds to block 410, where the system executes the SBE plan to obtain query results. The system may be configured to execute the SBE plan stages to generate the query results. For example, the system may execute the SBE plan to aggregate values of fields from multiple documents. As another example, the system may execute the SBE plan to aggregate documents requested by the query. In some embodiments, the system may be configured to iteratively process data objects (e.g., documents) in each stage of the plan. For example, the system may use an iterator that advances as each document is processed in a stage.

Next, process 400 proceeds to block 412, where the system outputs the query results. In some embodiments, the system may be configured to transmit the results to a client device from which the query was received at block 202. In some embodiments, the system may be configured to display results of the query in a GUI. In some embodiments, the system may be configured to transmit data obtained from the query through an API. The query results may be used by the client device (e.g., as part of executing a software application.

Example Query Execution

Described below is an example execution of a query, according to some embodiments of the technology described herein. For example, the example execution may result from performing process 400 described herein with reference to FIG. 4 (e.g., by query processing system 100 described herein with reference to FIG. 1). In this example, an MQL query is optimized into an SBE plan that may be executed to generate results of the query.

An example query received by the system is shown below.

[{$match: {a:{$eq:1}, c:{$eq:2}}}, {$sort: {a:1, b:1}}, {$project: {_id:0, c:1, d:1}}]

In some embodiments, the query pipeline is read from left to right.

Semantics of the query:
  a. First filter input collection such that field "a" is "1" and field "c" is "2".
  b. Then sort first on "a", then on "b".
  c. After that, retain only fields "c" and "d" as an output to the pipeline.

Translation from Query Text to Initial Logical Model.

In some embodiments, the query is translated into DocumentSource model. The document source serves as a concrete syntax tree. It contains a list of the stages: one Match document source, one Sort document stage, and one Project document source, each with additional parameters which refer to the fields being manipulated as well as additional options. Each pipeline stage corresponds 1:1 to a document source object.

In some embodiments, the system may be configured to iterate over the document sources and translate into the initial version of the query. In this example representation the system may be configured to adhere to the "linear" model where stages are sequentially ordered in the same order of the query. The example plan is to be read bottom up.

```
Root [{p3}]     // variable p3 is the answer of the query
Evaluation [{p3}] // variables p0, p1, p2, and p3 propagated up
|   EvalPath [ ]
|   |   Variable [p0] // variable p0 used here
|   PathKeep [c, d]
Collation [{p1: Ascending, p2: Ascending}]
Evaluation [{p2}] // variables p0, p1 and p2 propagated up
|   EvalPath [ ]
|   |   Variable [p0] // variable p0 used here
|   PathGet [b] PathIdentity [ ]
Evaluation [{p1}] // variables p0 and p1 propagated up
|   EvalPath [ ]
|   |   Variable [p0] // variable p0 used here
|   PathGet [a] PathIdentity [ ]
Filter [ ] // variable p0 propagated up
|   EvalFilter [ ]
|   |   Variable [p0] // variable p0 used here
|   PathGet [a] PathTraverse [1] PathCompare [Eq] Const [1]
Filter [ ] // variable p0 propagated up
|   EvalFilter [ ]
|   |   Variable [p0] // variable p0 used here
|   PathGet [c] PathTraverse [1] PathCompare [Eq] Const [2]
Scan [<collection_id>, {p0}] // variable p0 propagated up. This is the root value.
```

Example characteristics of the plan according to some embodiments:
  a. In some embodiments, plan may be read bottom-up. Scan stage feeds into filter stage, then into another filter stage, then into two evaluation nodes, then collation, then root
  b. In some embodiments, there isnt necessarily 1:1 correspondence between input stage and optimizer logical node. Collation for example is translated into 3 optimizer logical nodes.
  c. In some embodiments, optimizer logical nodes are lower-level primitives than input MQL stage.
  d. In some embodiments, Evaluation and Filter nodes have embedded "paths" within EvalPath and EvalFilter expressions.
    i. PathGet [a] Traverse [1] PathCompare [eq] Const [1]
    ii. Semantics
      1. Obtain field "a" from input.
      2. If it is an array run for each element the following, or if not, just run over the element the following statement, and return if obtained true result.
      3. Compare current value to a constant "1" and return true if equal.
    iii. Other relevant nodes for the example:
      1. PathKeep, PathField, PathIdentity Metadata Some embodiments consider metadata (e.g., available indexes) and collect information from the metadata. In this particular case for the purposes of the presentation the collection of documents may have two indexes:

```
coll.createIndez ({a: 1, b: 1}); // index 1
coll.createIndex ({c: 1, a: 1}); // index 2
```

Both of the above indexes are compound indexes. The first one is built using fields "a" and "b", sorting in increasing order for both, and the second one on "c" and "a" respectively. We also assume that fields "a" and "b" do not contain arrays, while field "c" contains them. This assumption is important for follow-up optimizations.

Substitution

In some embodiments, the system may be configured to reorder the optimizer logical nodes. This is done to achieve better performance in the following way.

In some embodiments, the system may be configured to pass individual values between stages. In the example above, the optimizer might pass a set of four variables: var1=1, var2=0, var3=2, var4=3. Each of those only has an internal meaning to the system, and the system knows how to associate them with underlying fields. In some embodiments, the system may be configured to pass the entire BSON {a: 1, b: 0, c: 2, d: 4} as a whole, this may be just another variable it keeps track of during the optimization process.

In some embodiments, the system splits PathKeep into a composition of PathField and PathGet ("unfuse").

First the following filter node is rewritten in the following way:

```
Evaluation [{p3}]
|  EvalPath [ ]
|  |  Variable [p0]
|  |  PathKeep [c, d]
   <rest of the plan>
```

The above filter node becomes:

```
Evaluation [{p3}]
|  EvalPath [ ]
|  |  Const [{ }]
```

```
|  PathComposeM [ ]
|  |  PathField [d]
|  |  |  PathConstant [ ]
|  |  |  Variable [p14]
|  |  PathField [c]
|  |  PathConstant [ ]
|  |  Variable [p13]
   <rest of the plan>
```

Note via this transformation the system dropped the dependence on "p0" which carried the root value, and the system refers to "p13" and "p14" individually which carry the values of "c" and "d".

The system applies another substitution rewrite. This rewrite collects the remaining evaluation and filter nodes and puts them into a structure we call a Sargable node in the following way.

```
Evaluation [{p2}]
|  EvalPath [ ]
|  |  Variable [p0]
|  PathGet [b]
|  PathIdentity [ ]
Evaluation [{p1}]
|  EvalPath [ ]
|  |  Variable [p0]
|  PathGet [a]
|  PathIdentity [ ]
Filter [ ]
|  EvalFilter [ ]
|  |  Variable [p0]
|  PathGet [a]
|  PathTraverse [1]
|  PathCompare [Eq]
|  Const [1]
Filter [ ]
|  EvalFilter [ ]
|  |  Variable [p0]
|  PathGet [c]
|  PathTraverse [1]
|  PathCompare [Eq]
|  Const [2]
   <rest of query>
```

The above becomes the below sargable node:

```
Sargable [Complete]
|  |  requirements :
|  |    {p0, 'PathGet [a] PathIdentity [ ]', p1, {{{=Const [1]}}}}
|  |    {p0, 'PathGet [b] PathIdentity [ ]', p2, {{{<fully open>}}}}
|  |    {p0, 'PathGet [c] PathIdentity [ ]', p13, {{{<fully open>}}}}
|  |    {p0, 'PathGet [c] PathTraverse [1] PathIdentity [ ]', {{{=Const [2]}}}}
|  |    {p0, 'PathGet [d] PathIdentity [ ]', p14, {{{<fully open>}}}}
<rest of query>
```

In some embodiments, the sargable node compactly represents the sequence of filter and evaluation nodes. It is a complex node which captures the generation and filtering aspects of multiple related fields. For each path which generates a variable (say for example PathGet ["a"] PathIdentity [ ]) an interval may be applied (in this example it is a point interval [1, 1] encoded as =1. In some embodiments, the sargable node simplifies further rewrites which allow a part of the query to be answered by an index or a combination of several indexes (index intersection). In some embodiments, the sargable node is a lossless representation of the original tree.

Putting the rewrites so far, the system generates the following rewritten tree.

```
Root [{p3}] // variable p3 is the answer of the query
Collation [{p1: Ascending, p2: Ascending}]
        // variables p3 propagated up.
        // variables p1 and p2 used here and NOT above.
Evaluation [{p3}]
        // variables p1, p2, p3 propagated up.
        // variables p13 and p14 used here and NOT above.
|   EvalPath [ ]
|   |   Const [{ }]
|   PathComposeM [ ]
|   |   PathField [d]
|   |   PathConstant [ ]
|   |   Variable [p14]
|   PathField [c]
|   PathConstant [ ]
|   Variable [p13]
Sargable [Complete]
        // variables p1, p2, p13 and p14 propagated up.
        // variable p0 used here and NOT used above.
|   |   requirements :
|   |       {p0, 'PathGet [a] PathIdentity [ ]', p1, {{{=Const [1]}}}}
|   |       {p0, 'PathGet [b] PathIdentity [ ]', p2, {{{<fully open>}}}}
|   |       {p0, 'PathGet [c] PathIdentity [ ]', p13, {{{<fully open>}}}}
|   |       {p0, 'PathGet [c] PathTraverse [1] PathIdentity [ ]', {{{=Const [2]}}}}
|   |       {p0, 'PathGet [d] PathIdentity [ ]', p14, {{{<fully open>}}}}
Scan [<collection_id> , {p0}]
        // variable p0 propagated up. This is the root value.
```

In the above example, instead of a single variable p0 being passed all the way to the root of the plan which is potentially expensive (e.g., because a document can be very large), the system passes several individual variables up. Each one holds only a single field of the document and collectively the variables are much smaller than the documents which p0 holds. This allows the new system to produce a plan that can be executed faster. Moreover this gives the system more flexibility to satisfy the answer of the query on a more granular level for example via an index which may deliver only one or two fields at a time.

Cascade Optimization

The phases so far have applied rewrites unconditionally. Every rewrite has led to the query tree being updated "in-place" without creating "alternatives". This phase on the other hand creates multiple query alternatives. This is useful in settings where there may be multiple possible query plans (for example plans using different combinations of indexes) which need to be weighted against each other.

Some embodiments use the cascades query optimization framework. During the cascades optimization phase a number of alternatives are created. Conceptually they represent different ways an execution plan can be constructed. For example, the original query refers to multiple fields "a", "b", "c", and "d". Note that the field "c" in the above example can be separately filtered on (looking into arrays) and also expected to be returned as a whole. The cascades framework enables the system to split the obtaining of the individual fields between index and collection scan-based access. For example fields "a" and "b" can be obtained via an index scan (using index_1 in our example above), while the fields "c" and "d" can be obtained (or fetching) from the collection scan. Moreover the framework supports joint field delivery via several indexes (e.g. index intersection).

In this example, each such split is assigned to an equivalence class, also referred to as a "group". The collection of groups is referred to as a "memo". The cascades algorithm starts using the query as rewritten by the previous phase 3 as input, and populates the memo with a number of alternatives. For the example query above, the process generates 40 distinct equivalence groups including the below example groups:

a. Group 0: fetch all filters and filter using a collection scan alone.
b. Group 1: using index_1 to deliver fields "a" and "b" and fetch "c" and "d" from the collection.
c. Group 2: using index_2, deliver "c" alone, and fetch "a", "b" and "d" from the collection.

In some embodiments, each alternative does not necessarily represent a complete query alternative. It is an alternative strategy for a part of the query. Some embodiments use a property that states that the best overall query plan is made by the best overall sub plans for each of its constituent pieces. As such, an alternative in a given memo group can refer to the result generated by another alternative. This separation also allows the system to explore a manageable number of alternatives.

In some embodiments, whenever the system creates a new group, the system may be configured to invoke the Cardinality Estimation (CE) module to determine how many documents are expected to be produced by alternatives in the group. This information is stored within the group metadata and available later to determine the final plan costs. The system may be further configured to compute other pieces of information, such as the projections this group exposes to the rest of the query.

In some embodiments, to produce the final physical plan, the system makes a top-down optimization pass. Starting from the memo group which encodes the entire query, the system descends down into the individual alternatives and asks each one to produce the best plan. This is a recursive process, which leads to each alternative to seek the best plan from its sub-alternatives until the system reaches a part of the query for which the system can determine the best physical plan directly. During this process, the system may keep track of a number of properties which we may be referred to as "requirements". The requirements encode different conditions based on which the system selects the best plan. In other words the best plan is specific to the conditions. Example conditions may relate to:

a. Which projections are required by the current alternative.
b. Is this alternative's output required to be sorted and if so on which field?
c. Is this alternative's output required to be generated entirely via one or more indexes, or can it also be generated via a collection scan, or a combination thereof.

In some embodiments, as the optimization process moves in a top-down fashion from the high-level alternatives (encoding the entire query, or a large portions of it) to lower-level alternatives (such which encode only small pieces of the query), the requirements may change depending on the demands of the optimization for the particular part of the query being optimized.

In some embodiments, even though the system may compute its best plan potentially many times for individual requirements, the system stores this information as part of the memo structure. The system may be configured to re-use the information in case the system encounters the need to optimize the same alternative under identical or "compatible" circumstances.

Generate SBE Plan

In some embodiments, after the optimization stage the final query plan is translated into the executable form called SBE. In some embodiments, the SBE plan consists of a tree of nodes called plan stages, expressions, and slots. Plan stages may implement various evaluation algorithms such as hash join, aggregation, sorting, filter evaluation etc. Expressions may be used by plan stages to evaluate runtime parts of their algorithms like predicates in filter stages, aggregate expressions in aggregate stages, key comparisons in sorting and so on. Slots may hold values produced by plan stages or a global runtime environment and can be referenced by other stages and expressions as variables.

The following SBE plan is generated for the example query:

```
[5] project [s4 =
    let [
        l101.0 =
            if (exists(s2) || isObject({ }))
            then setField({ }, "c", s2)
            else { }
    ]
    in
        if (exists(s3) || isObject(l101.0))
        then setField(move(l101.0), "d", s3)
        else move(l101.0)
]
[4] nlj inner [s1] [s1] {true}
    left
        [0] ixseek ks(1ll, 0, 1L, minKey, 1ll) ks(1ll, 0, 1L, maxKey, 2ll) none s1
none none [ ] @"6777bb55-ab37-46af-9ebc-2456e539dc8e" @"a_1_b_1" true
    right
        [3] filter {(traverseF(s2, lambda(l101.0) { (move(l101.0) == 2L) }, false)
?: false)}
        [2] limitskip 1 0
        [1] seek s1 none none none none none none none none [s2 = c, s3 = d]
@"6777bb55-ab37-46af-9ebc-2456e539dc8e" true false
```

In the example above:

a. Plan forms a tree with a root node [5] and two leaf nodes [0] and [1]
b. The system uses the "a_1_b_1" index [0] to produce record IDs that are then used to fetch the record from the base collection [1]
c. The slot "s1" is used to pass the record ID between the index and the collection
d. Paths from the optimizer are translated to low level array traversals and lambda expressions, field access is pushed down all the way to the collection. The slot "s2" holds the field "c" and the slot "s3" holds the field "d".
e. The documents are processed in the order of "a_1_b_1" index so the system does not need an explicit sorting stage SBE Execution In some embodiments, the SBE execution follows the iterator based pull model. For example, every plan stage implements a "getNext" method that advances the iterator to the next document. Internally every stage calls "getNext" on its inputs.

Example Architecture of Query Processing System

Figure 5:
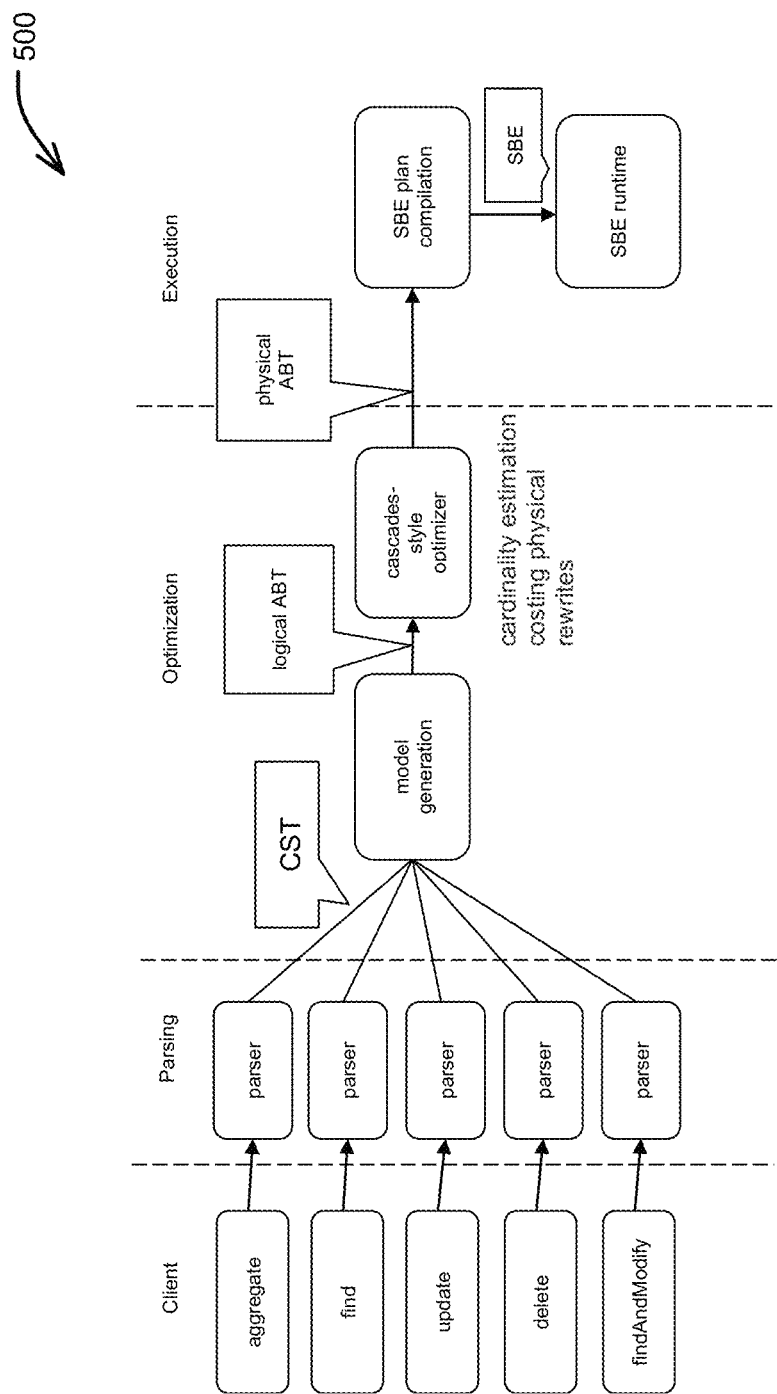
FIG. 5 illustrates an example architecture of a query processing system, according to some embodiments of the technology described herein.

FIG. 5 illustrates an example architecture 500 for query processing system 100, according to some embodiments of the technology described herein. The architecture 500 illustrates various phases of query processing performed by the query processing system 100. The phases include parsing (e.g., performed by the interface module 102), optimization (e.g., performed by the query optimizer 104), and execution (e.g., performed by the execution engine 106).

As shown in the example of FIG. 5, the architecture 500 involves the use of various data structures including the following:

a. A concrete syntax tree (CST) that is an output of the parsing phase. This may also be referred to as a "parse tree". This is aware of the syntax of the input language (e.g., Mongo query language (MQL)).

b. A logical ABT which models the query in an abstract way. The logical ABT may be suitable for transformation by the query optimizer 104. The logical ABT may describes what the query is but not necessarily how to execute it (e.g., it does not name specific algorithms for joins, aggregations, and/or other operations).

c. A physical ABT may be an output of the optimization phase. The physical ABT may be an optimized version of the logical ABT which describes how a plan can be executed. For example, the physical ABT may specify specific types of join (e.g., hash join, nested loop join, and/or another type of join) as opposed to just join.

d. SBE plan is a tree of operators used at runtime to execute a query. In some embodiments, the SBE plan may include executable instructions (e.g., bytecode). For example, the instructions may be executed using a computer hardware processor (e.g., assigned to a virtual machine) in order to execute the query.

As shown in FIG. 5, a query is received from a client device and parsed to generate a CST. In the optimization phase, model generation is performed using the CST to generate a logical ABT. The logical ABT is used by an cascades-style optimizer to generate a physical ABT. SBE plan compilation is performed to generate an SBE plan using the physical ABT. The execution phase includes an SBE runtime that executes the SBE plan. For example, a virtual machine may launch the SBE runtime and execute the SBE plan to generate a query response.

In some embodiments, the architecture 500 may be a common query framework (CQF). The framework does not include distinct subsystems for different operations (e.g., find, aggregate, update, and/or other operations). Rather, all operations are executed using the same processing pipeline. Some embodiments use statistics-based cardinality estimation (CE) and cost determination.

Some embodiments reduce the surface area of a query API. For example, some embodiments remove the group, geoNear, and geoSearch commands, and deprecate the mapReduce command. As another example, some embodiments remove the mapReduce command, as well as deprecate and remove the distinct command.

As illustrated in FIG. 5, some embodiments use separate data structures during each phase of processing as the query progresses through CST, ABT, and SBE representations. Some embodiments of the CQF architecture use distributed optimization or single-node intraquery parallelism. In distributed optimization, a single node may choose the plan across the entire cluster, inserting the necessary exchange operators in order to achieve parallelism and to transfer data between nodes involved in the plan.

Figure 6:
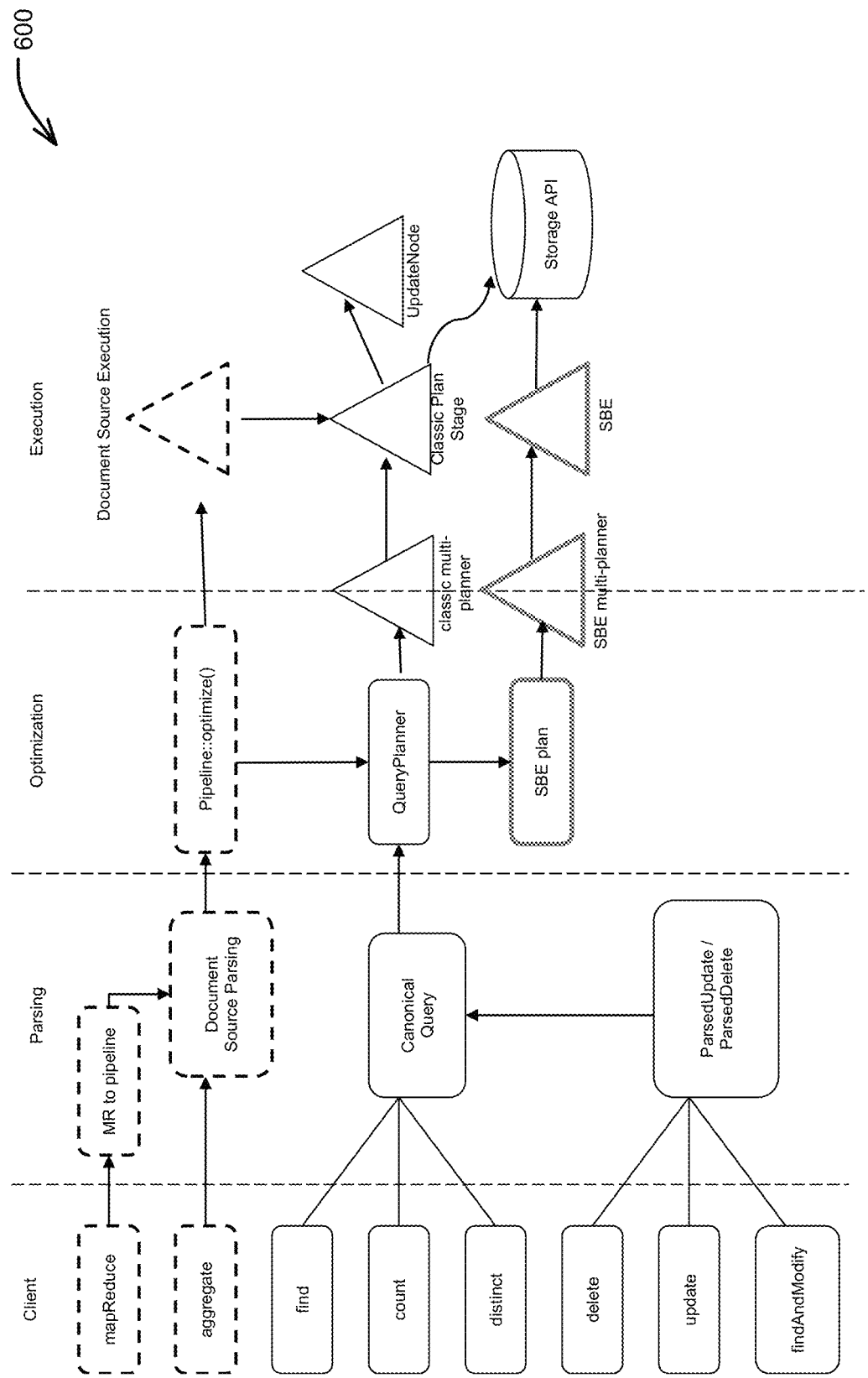
FIG. 6 illustrates another example architecture of a query processing system, according to some embodiments of the technology described herein.

FIG. 6 illustrates another example architecture 600 for query processing system 100, according to some embodiments of the technology described herein. In the architecture 600 of FIG. 6, an SBE plan generation exist in conjunction with another query planner in the optimization phase. The SBE plan compilation may take a set of query solution trees produced by the query planner and lower them into an equivalent set of SBE trees. Classes which perform this may be referred to as "SBE stage builders". The optimization phase further includes an SBE multi-planner which receives SBE trees produced by the SBE plan compilation. The SBE multi-planner may select one of the SBE trees.

As illustrated in FIG. 6, in some embodiments, the SBE-based components (e.g., SBE plan, SBE multi-planner, and SBE) coexist with counterpart query processing components. In such embodiments, an SBE-eligible query may be directed to the SBE-based processing pipeline. Other queries may bypass the SBE plan compilation and use the other query processing pipeline.

Figure 7:
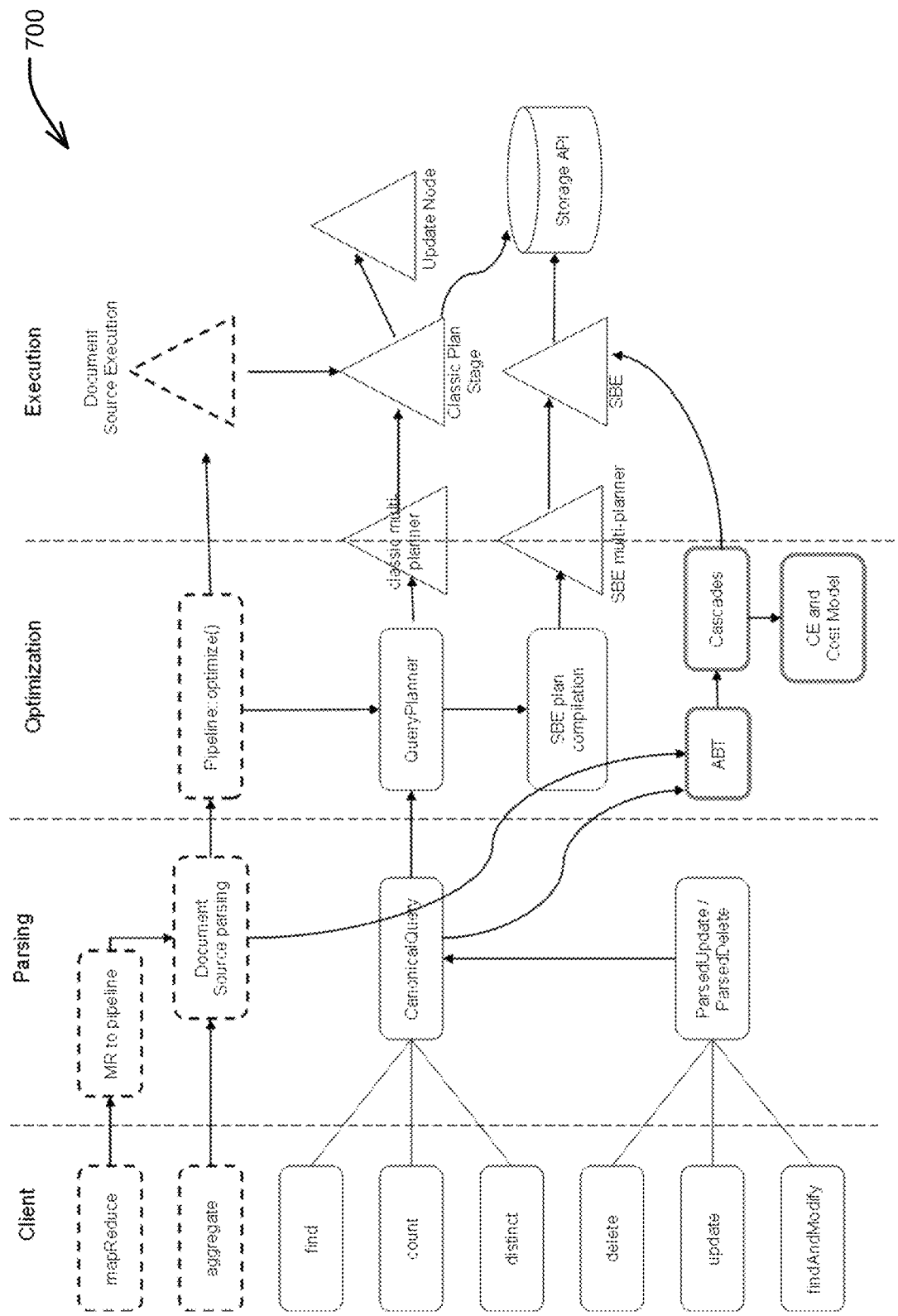
FIG. 7 illustrates another example architecture of a query processing system, according to some embodiments of the technology described herein.
Figure 8:
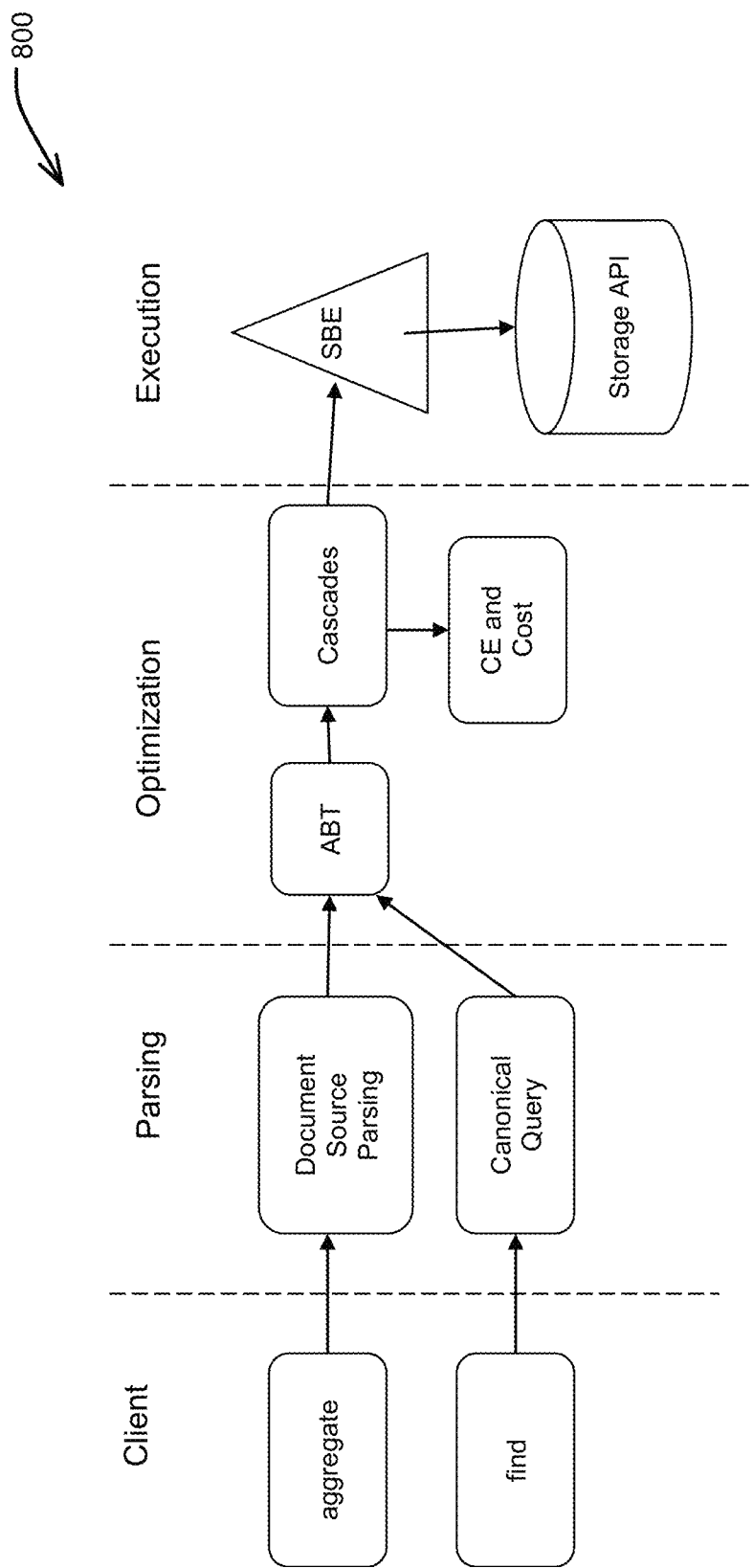
FIG. 8 illustrates another example architecture of a query processing system, according to some embodiments of the technology described herein.

FIG. 7 illustrates another example architecture 700 for query processing system 100, according to some embodiments of the technology described herein. As illustrated by the architecture 700, find and aggregate commands may be converted to an ABT. Then, the ABT is optimized via a cascades-style optimizer. For example, the optimizer may use a cost model to identify a plan with a lowest associated cost. The cost model may estimate a cardinality based on a sample of a collection. A physical plan (e.g., a physical ABT) chosen by the optimizer may be compiled into an SBE tree and executed by the SBE execution engine. FIG. 8 illustrates another example architecture 800 for query processing system 100, according to some embodiments of the technology described herein. The architecture 800 shows an example in which find and aggregate commands are parsed and converted into an ABT. The ABT is then optimized by the cascades optimizer which determines a cardinality estimation (CE) and cost. The cascades optimizer outputs an SBE plan which is executed. The results are stored in the storage API.

Figure 9:
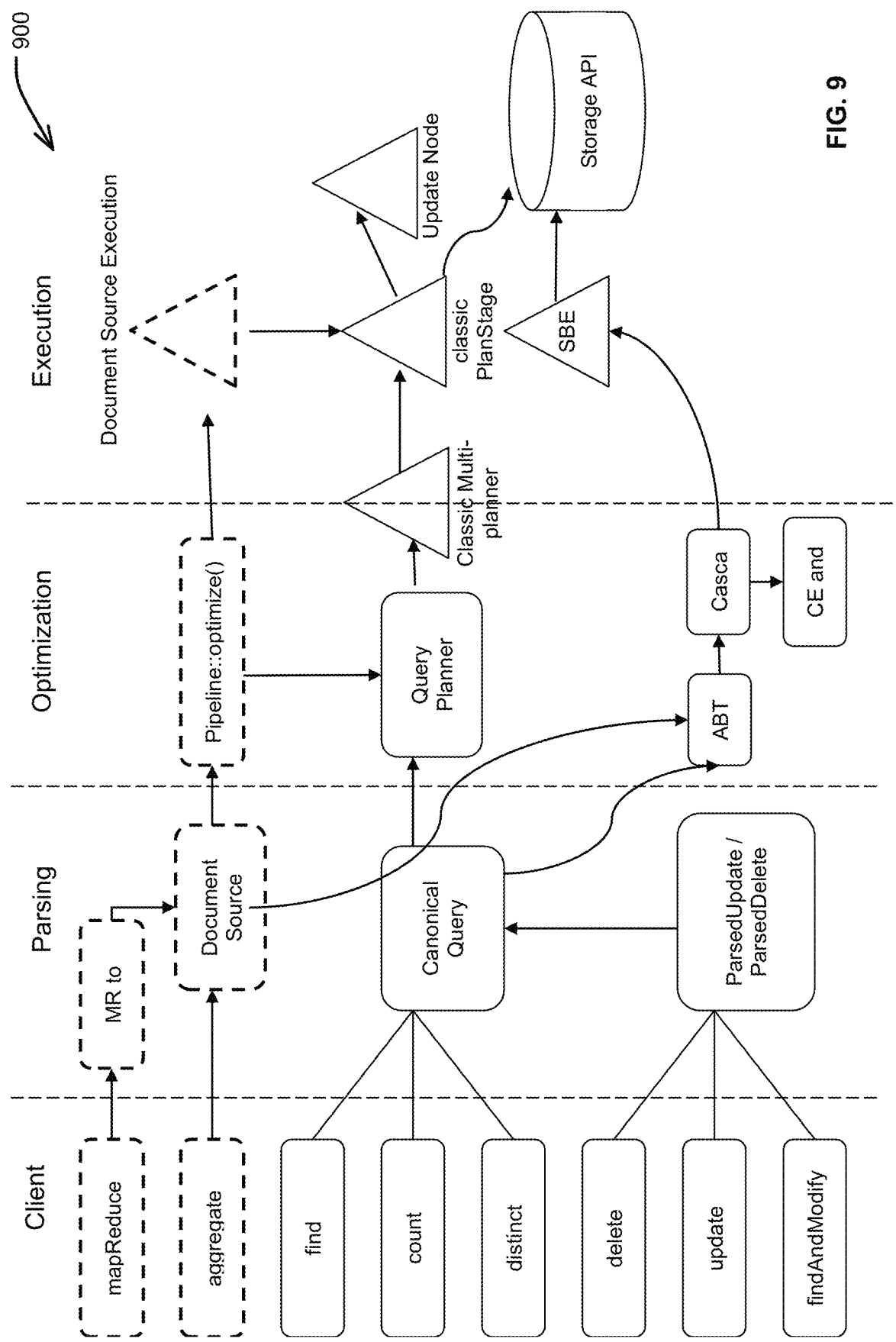
FIG. 9 illustrates another example architecture of a query processing system, according to some embodiments of the technology described herein.

FIG. 9 illustrates another example architecture 900 for query processing system 100, according to some embodiments of the technology described herein. The architecture 900 uses a hybrid execution that supports hybrid execution that uses both SBE-based execution and another type of execution (e.g., DocumentSource). In such execution, as much of a query as possible is pushed down such that it is executed using an SBE. Any portion that remains is executed by DocumentSource. This may allow the SBE-based execution to be performed for more scenarios even if the entire query may not be performed using SBE-based execution. After converting a query to its DocumentSource representation, some embodiments find the largest possible prefix of the pipeline that can be performed using the SBE-based execution. This portion may be processed using SBE-based execution and the remainder of the query may be processed using the other type of execution.

Figure 10:
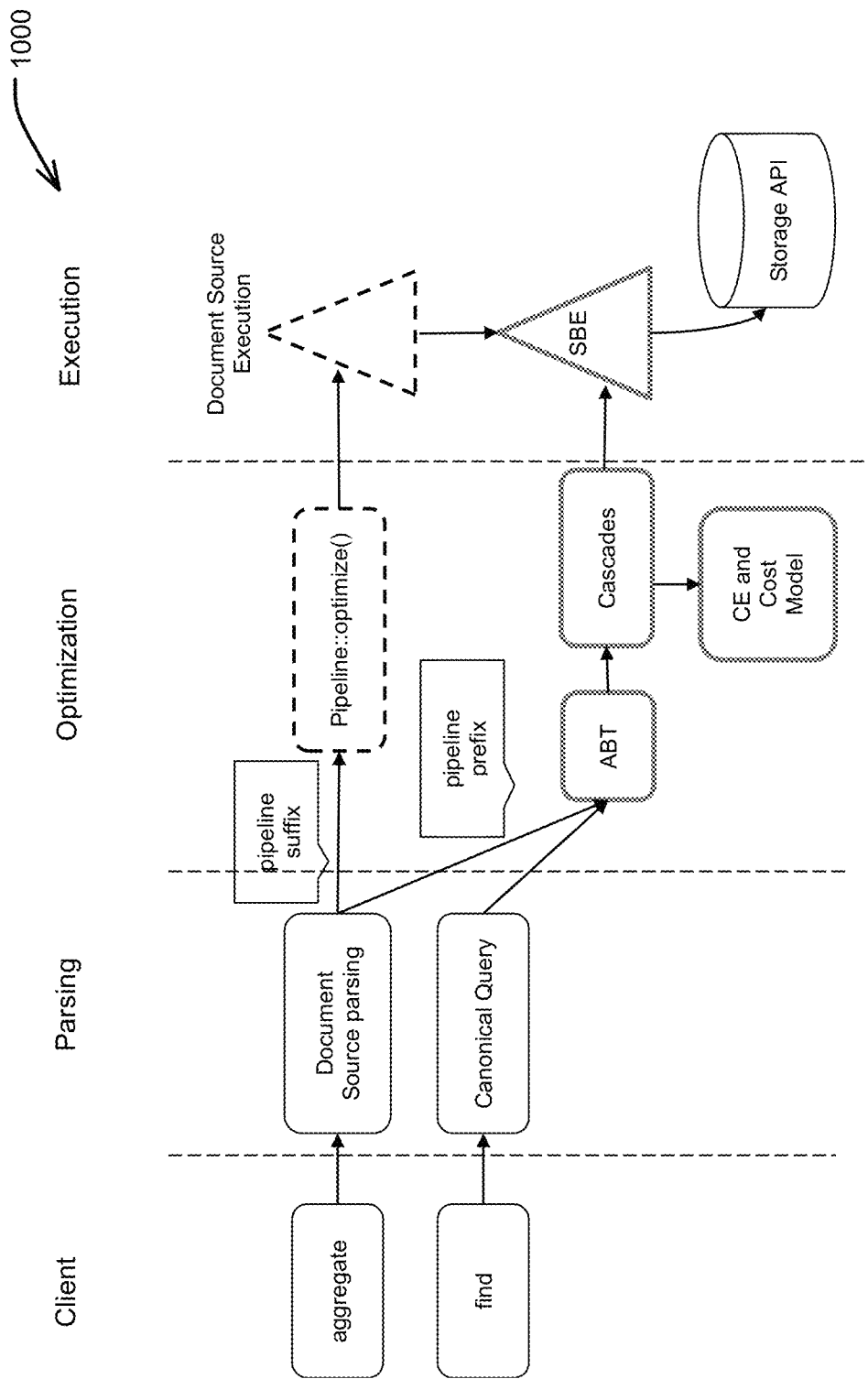
FIG. 10 illustrates another example architecture of a query processing system, according to some embodiments of the technology described herein.

FIG. 10 illustrates another example architecture 1000 for query processing system 100, according to some embodiments of the technology described herein. In the architecture 1000 of FIG. 10, the aggregate operation is parsed using DocumentSource processing. A portion of the operation (the "pipeline suffix") is performed using DocumentSource execution. Another portion of the aggregate operation (the "pipeline prefix") is performed using SBE-based execution (e.g., generating an ABT, optimizing the ABT, generating an SBE plan using the optimized ABT, and executing the SBE plan). In the example of FIG. 10, the find operation is preformed using only SBE-based execution.

Example Computer System

Figure 11:
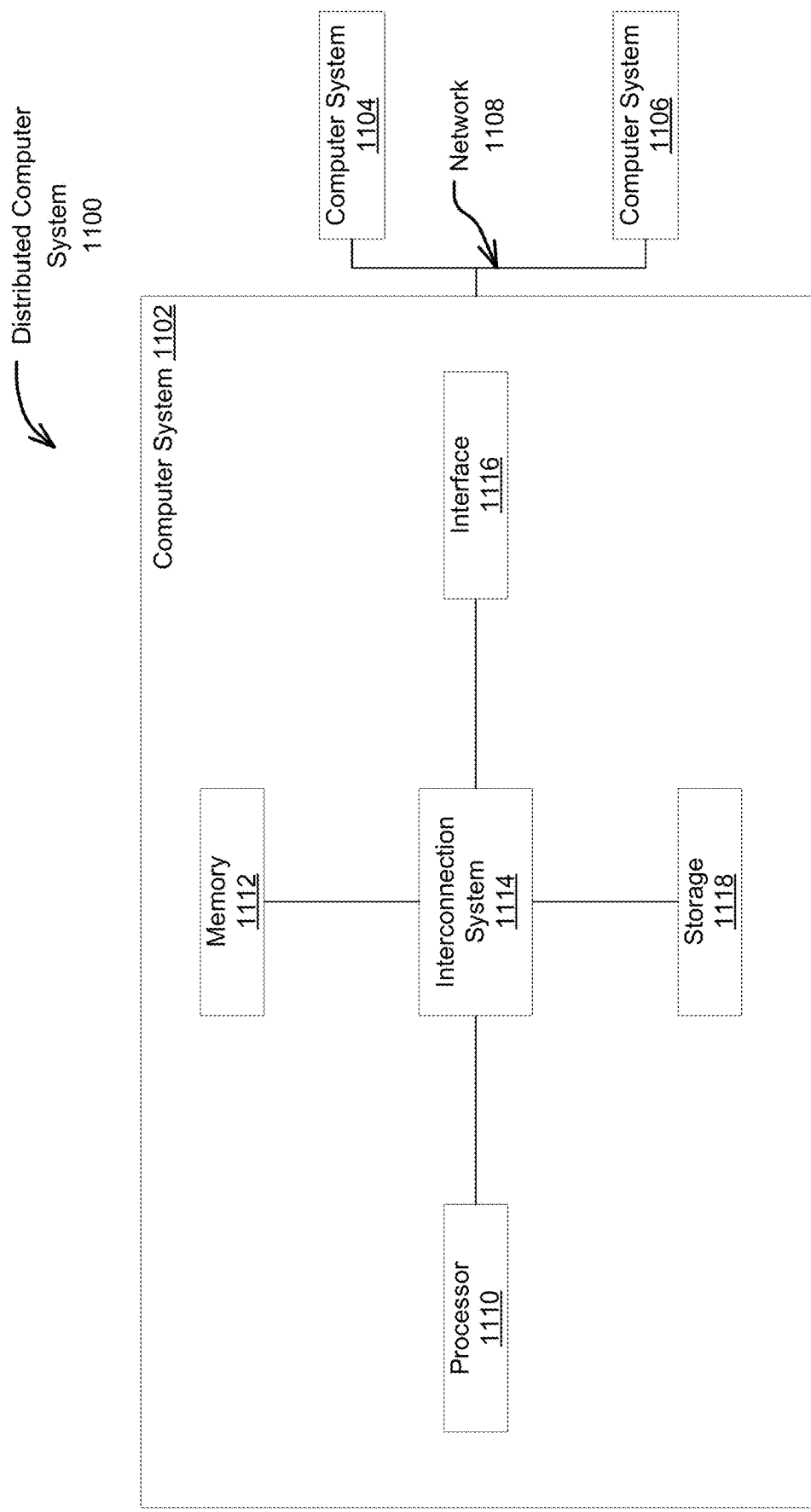
FIG. 11 is a block diagram of a distributed computer system that may be used to implement some embodiments of the technology described herein.

FIG. 11, shows a block diagram of a specially configured distributed computer system 1100, in which some embodiments of the technology described herein can be implemented. As shown, the distributed computer system 1100 includes one or more computer systems that exchange information. More specifically, the distributed computer system 1100 includes computer systems 1102, 1104, and 1106. As shown, the computer systems 1102, 1104, and 1106 are interconnected by, and may exchange data through, a communication network 1108. The network 1108 may include any communication network through which computer systems may exchange data. To exchange data using the network 1108, the computer systems 1102, 1104, and 1106 and the network 1108 may use various methods, protocols, and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, JSON, SOAP, CORBA, REST, and Web Services. To ensure data transfer is secure, the computer systems 1102, 1104, and 1106 may transmit data via the network 1108 using a variety of security measures including, for example, SSL or VPN technologies. While the distributed computer system 1100 illustrates three networked computer systems, the distributed computer system 1100 is not so limited and may include any number of computer systems and computing devices, networked using any medium and communication protocol.

As illustrated in FIG. 11, the computer system 1102 includes a processor 1110, a memory 1112, an interconnection element 1114, an interface 1116 and data storage element 1118. To implement at least some of the aspects, functions, and processes disclosed herein, the processor 1110 performs a series of instructions that result in manipulated data. The processor 1110 may be any type of processor, multiprocessor, or controller. Example processors may include a commercially available processor such as an Intel Xeon, Itanium, Core, Celeron, or Pentium processor; an AMD Opteron processor; an Apple processor; a Sun Ultra-SPARC processor; an IBM Power5+ processor; an IBM mainframe chip; or a quantum computer. The processor 1110 is connected to other system components, including one or more memory devices 1112, by the interconnection element 1114.

The memory 1112 stores programs (e.g., sequences of instructions coded to be executable by the processor 1110) and data during operation of the computer system 1102. Thus, the memory 1112 may be a relatively high performance, volatile, random access memory such as a dynamic random access memory ("DRAM") or static memory ("SRAM"). However, the memory 1112 may include any device for storing data, such as a disk drive or other nonvolatile storage device. Various examples may organize the memory 1112 into particularized and, in some cases, unique structures to perform the functions disclosed herein. These data structures may be sized and organized to store values for particular data and types of data.

Components of the computer system 1102 are coupled by an interconnection element such as the interconnection mechanism 1114. The interconnection element 1114 may include any communication coupling between system components such as one or more physical busses in conformance with specialized or standard computing bus technologies such as IDE, SCSI, PCI, and InfiniBand. The interconnection element 1114 enables communications, including instructions and data, to be exchanged between system components of the computer system 1102.

The computer system 1102 also includes one or more interface devices 1116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1102 to exchange information and to communicate with external entities, such as users and other systems.

The data storage element 1118 includes a computer readable and writeable nonvolatile, or non-transitory, data storage medium in which instructions are stored that define a program or other object that is executed by the processor 1110. The data storage element 1118 also may include information that is recorded, on or in, the medium, and that is processed by the processor 1110 during execution of the program. More specifically, the information may be stored in one or more data structures specifically configured to conserve storage space or increase data exchange performance. The instructions may be persistently stored as encoded signals, and the instructions may cause the processor 1110 to perform any of the functions described herein. The medium may, for example, be optical disk, magnetic disk, or flash memory, among others. In operation, the processor 1110 or some other controller causes data to be read from the nonvolatile recording medium into another memory, such as the memory 1112, that allows for faster access to the information by the processor 1110 than does the storage medium included in the data storage element 1118. The memory may be located in the data storage element 1118 or in the memory 1112, however, the processor 1110 manipulates the data within the memory, and then copies the data to the storage medium associated with the data storage element 1118 after processing is completed. A variety of components may manage data movement between the storage medium and other memory elements and examples are not limited to particular data management components. Further, examples are not limited to a particular memory system or data storage system.

Although the computer system 1102 is shown by way of example as one type of computer system upon which various aspects and functions may be practiced, aspects and functions are not limited to being implemented on the computer system 1102 as shown in FIG. 11. Various aspects and functions may be practiced on one or more computers having a different architectures or components than that shown in FIG. 11. For instance, the computer system 1102 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1102 may be a computer system including an operating system that manages at least a portion of the hardware elements included in the computer system 1102. In some examples, a processor or controller, such as the processor 1110, executes an operating system. Examples of a particular operating system that may be executed include a Windows-based operating system, such as, Windows 11 or 11 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 1110 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML, or other formats, when viewed in a window of a browser program, can render aspects of a graphical-user interface, or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user." It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for executing queries against a non-relational database storing a plurality of data objects, the plurality of data objects storing data as values of fields, the system comprising:
   a processor; and
   memory storing instructions that, when executed by the processor, cause the processor to:
      receive a query specifying one or more criteria for objects stored in the non-relational database;
      generate a slot-based execution (SBE) plan for execution of the query, the SBE plan comprising a plurality of stages, the plurality of stages each comprising:
         one or more slots for storing one or more values produced from execution of one or more operations, the one or more slots each having a configuration that controls which of the plurality of stages can access the slot;
      execute the SBE plan, wherein executing the SBE plan comprises:
         access, during execution of a first stage of the plurality of stages, at least one field value from at least one data object of the plurality of data objects, the at least one field value required for execution of a second stage of the plurality of stages;
         store the at least one field value in at least one slot of the first stage, the at least one slot having a configuration that provides the second stage with access to the at least one slot; and
         execute the second stage at least in part by accessing the at least one field value from the at least one slot of the first stage.

2. The system of claim 1, wherein the instructions further cause the processor to execute the second stage at least in part by accessing the at least one field value from the at least one slot without accessing other data from the at least one data object.

3. The system of claim 1, wherein the instructions further cause the processor to generate the SBE plan by performing:
   generate a logical representation of the query; and
   generate the SBE plan using the logical representation of the query.

4. The system of claim 3, wherein the instructions further cause the processor to generate the SBE plan using the logical representation of the query by performing:
   optimize the logical representation to obtain an optimized logical representation of the query; and
   generate the SBE plan using the optimized logical representation of the query.

5. The system of claim 4, wherein the logical representation comprises a plurality of nodes each comprising a respective operation, and the instructions further cause the processor to optimize the logical representation to obtain the optimized logical representation of the query by performing:

modify a node comprising an operation to read the at least one data object such that the node comprises an operation to:
read the at least one field value from the at least one data object; and
store the at least one field value in the at least one slot of the first stage.

6. The system of claim 3, wherein the instructions further cause the processor to generate the logical representation of the query by performing:
generate a logical abstract binding tree (ABT) as the logical representation of the query.

7. The system of claim 6, wherein the instructions further cause the processor to generate the SBE plan using the logical representation of the query by performing:
generate a physical ABT using the logical ABT; and
generate the SBE plan using the physical ABT.

8. The system of claim 1, wherein the instructions further cause the processor to generate the SBE plan by performing:
configure the at least one slot of the first stage to be accessible by the second stage.

9. The system of claim 1, wherein the at least one data object stores a plurality of field values including the at least one field value and storing the at least one field value in the at least one slot of the first stage comprises:
storing the at least one field value from the at least one data object without storing any other field values of the plurality of field values for use in execution of the second stage.

10. A method for executing queries against a non-relational database storing a plurality of data objects, the plurality of data objects storing data as values of fields, the method comprising:
using a processor to perform:
receiving a query specifying one or more criteria for objects stored in the non-relational database;
generating a slot-based execution (SBE) plan for execution of the query, the SBE plan comprising a plurality of stages, the plurality of stages each comprising:
one or more slots for storing one or more values produced from execution of one or more operations, the one or more slots each having a configuration that controls which of the plurality of stages can access the slot;
executing the SBE plan, wherein executing the SBE plan comprises:
accessing, during execution of a first stage of the plurality of stages, at least one field value from at least one data object of the plurality of data objects, the at least one field value required for execution of a second stage of the plurality of stages;
storing the at least one field value in at least one slot of the first stage, the at least one slot having a configuration that provides the second stage with access to the at least one slot; and
executing the second stage at least in part by accessing the at least one field value from the at least one slot of the first stage.

11. The method of claim 10, wherein executing the second stage comprises accessing the at least one field value from the at least one slot without accessing other data from the at least one data object.

12. The method of claim 10, wherein generating the SBE plan comprises:
generating a logical representation of the query; and
generating the SBE plan using the logical representation of the query.

13. The method of claim 12, wherein generating the SBE plan using the logical representation of the query comprises:
optimize the logical representation to obtain an optimized logical representation of the query; and
generate the SBE plan using the optimized logical representation of the query.

14. The method of claim 13, wherein the logical representation comprises a plurality of nodes each comprising a respective operation, and optimizing the logical representation to obtain the optimized logical representation of the query comprises:
modifying a node comprising an operation to read the at least one data object such that the node comprises an operation to:
read the at least one field value from the at least one data object; and
store the at least one field value in the at least one slot of the first stage.

15. The method of claim 12, wherein generating the logical representation of the query comprises:
generating a logical abstract binding tree (ABT) as the logical representation of the query.

16. The method of claim 15, wherein generating the SBE plan using the logical representation of the query comprises:
generating a physical ABT using the logical ABT; and
generating the SBE plan using the physical ABT.

17. The method of claim 16, wherein generating the SBE plan comprises:
configuring the at least one slot of the first stage to be accessible by the second stage.

18. A non-transitory computer-readable storage medium storing instructions that, when executed by a processor, cause the processor to perform a method for executing queries against a non-relational database storing a plurality of data objects, the plurality of data objects storing data as values of fields, the method comprising:
receiving a query specifying one or more criteria for objects stored in the non-relational database;
generating a slot-based execution (SBE) plan for execution of the query, the SBE plan comprising a plurality of stages, the plurality of stages each comprising:
one or more slots for storing one or more values produced from execution of one or more operations, the one or more slots each having a configuration that controls which of the plurality of stages can access the slot;
executing the SBE plan, wherein executing the SBE plan comprises:
accessing, during execution of a first stage of the plurality of stages, at least one field value from at least one data object of the plurality of data objects, the at least one field value required for execution of a second stage of the plurality of stages;
storing the at least one field value in at least one slot of the first stage, the at least one slot having a configuration that provides the second stage with access to the at least one slot; and
executing the second stage at least in part by accessing the at least one field value from the at least one slot of the first stage.

19. The non-transitory computer-readable storage medium of claim 18, wherein executing the second stage comprises accessing the at least one field value from the at least one slot without accessing other data from the at least one data object.

20. The non-transitory computer-readable storage medium of claim 18, wherein generating the SBE plan comprises:
    generating a logical representation of the query; and
    generating the SBE plan using the logical representation of the query.

* * * * *